US012659397B2

(12) United States Patent
Inoue et al.

(10) Patent No.: US 12,659,397 B2
(45) Date of Patent: Jun. 16, 2026

(54) INFORMATION TERMINAL, NOTIFICATION INFORMATION MANAGEMENT METHOD, AND RECORDING MEDIUM

(71) Applicant: CASIO COMPUTER CO., LTD., Tokyo (JP)

(72) Inventors: Hiromi Inoue, Akishima (JP); Takeshi Hanada, Tachikawa (JP); Takanori Taniguchi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 360 days.

(21) Appl. No.: 18/448,308

(22) Filed: Aug. 11, 2023

(65) Prior Publication Data

US 2024/0064225 A1 Feb. 22, 2024

(30) Foreign Application Priority Data

Aug. 16, 2022 (JP) ................................. 2022-129595
Dec. 19, 2022 (JP) ................................. 2022-201960

(51) Int. Cl.
*H04M 1/72409* (2021.01)
*H04M 1/72412* (2021.01)
*H04M 1/72451* (2021.01)

(52) U.S. Cl.
CPC . *H04M 1/72412* (2021.01); *H04M 1/724095* (2022.02); *H04M 1/72451* (2021.01); *H04M 2201/38* (2013.01)

(58) Field of Classification Search
CPC ....... H04M 1/72412; H04M 1/724095; H04M 1/72451; H04M 1/72409; H04M 2201/38
See application file for complete search history.

(56) References Cited

U.S. PATENT DOCUMENTS

2007/0072629 A1* 3/2007 Bae ................... H04M 1/72451
                                                              455/461
2015/0382322 A1 12/2015 Migicovsky et al.
2020/0310360 A1* 10/2020 Hasegawa .............. G04G 21/04

FOREIGN PATENT DOCUMENTS

JP        2011049801 A     3/2011
JP        2017167054 A     9/2017
JP        2018021765 A     2/2018
JP        2020169820 A     10/2020

OTHER PUBLICATIONS

Extended European Search Report dated Jan. 5, 2024 received in European Patent Application No. EP 23186980.1.

* cited by examiner

*Primary Examiner* — Tuan H Nguyen
(74) *Attorney, Agent, or Firm* — Scully, Scott, Murphy & Presser, P.C.

(57) ABSTRACT

An information terminal includes: a processor: in response to information of a first category being acquired, stores the first category as display target information; in response to information of a category to which second notification information being acquired at a timing after the information of the first category is acquired, and if the category is the first category, stores the first category as the display target information; and in response to information of the category being acquired, and if the category is a second category different from the first category, stores the second category as the display target information.

20 Claims, 22 Drawing Sheets

FIG. 4

| | | DISPLAY EXAMPLE |
|---|---|---|
| NEW INFORMATION An (CATEGORY a) | 360° MOVING IMAGE INFORMATION | 360 |
| NEW INFORMATION Bn (CATEGORY b) | NEW DISCOVERY INFORMATION | DIS |
| NEW INFORMATION Cn (CATEGORY c) | EVENT INFORMATION | CHK! |
| NEW INFORMATION Dn (CATEGORY d) | NEW PRODUCT INFORMATION | NEW! |
| BIRTHDAY INFORMATION E (PERSONAL CATEGORY e) | BIRTHDAY | HBD! |
| PURCHASE ANNIVERSARY INFORMATION F (PERSONAL CATEGORY f) | PURCHASE ANNIVERSARY | TNKS |

INFORMATION TERMINAL, NOTIFICATION INFORMATION MANAGEMENT METHOD, AND RECORDING MEDIUM

CROSS-REFERENCE TO RELATED APPLICATIONS

This application is based upon and calms the benefit of priority from Japanese Patent Applications No. 2022-129595 filed on Aug. 16, 2022 and No. 2022-201960 filed on Dec. 19, 2022, the entire contents of which are incorporated herein by reference.

BACKGROUND

Technical Field

The present invention relates to an information terminal, a notification information management method, and a recording medium.

Related Art

Conventionally, a smartphone that displays notification information received from a server or the like, a smart watch that displays notification information received from a smartphone, and the like are known. In the case of a smart watch, even in a state where a smartphone is placed in a bag, a pocket, or the like, notification is sent to the smart watch, so that a user can easily know that the information has been received.

Since the smartwatch includes a display (liquid crystal display, for example) having a relatively high resolution and a wide display area, there has been no problem in displaying notification information received from an external device such as a smartphone or a server. On the other hand, an electronic wristwatch in which a display area and a storage area are relatively limited is known. In order to achieve power saving, such an electronic wristwatch has a display unit (liquid crystal display) having a relatively low resolution and a small display area without mounting a high-resolution and large-sized display, which makes it difficult to display notification information received from an external device in the electronic wristwatch.

Therefore, according to JP 2011-049801 A for example, a function of an electronic wristwatch has been developed. The function is to acquire, by wireless communication, information on incoming e-mails received by a mobile phone and display the number of unread e-mails and the number of unopened e-mails.

SUMMARY

An information terminal according to an embodiment of the present invention is summarized as including a processor that: in response to information of a first category to which first notification information to be notified to a user belongs being acquired, stores the first category as display target information; in response to information of a category to which second notification information, different from the first notification information, being acquired at a timing after the information of the first category is acquired, and if the category to which the second notification information belongs is the first category, stores the first category as the display target information; and in response to information of a category to which second notification information, different from the first notification information, being acquired at a timing after the information of the first category is acquired, and if the category to which the second notification information belongs is a second category different from the first category, stores the second category as the display target information.

A notification information management method by an information terminal according to an embodiment of the present invention is summarizes as including at least one processor, the method including: in response to information of a first category to which first notification information to be notified to a user belongs being acquired, storing, by the at least one processor, the first category as display target information; in response to information of a category to which second notification information, different from the first notification information, being acquired at a timing after the information of the first category is acquired, and if the category to which the second notification information belongs is the first category, storing, by the at least one processor, the first category as the display target information; and in response to the information of the category to which the second notification information being acquired at a timing after the information of the first category is acquired, and if the category to which the second notification information belongs is a second category different from the first category, storing, by the at least one processor, the second category as the display target information.

A non-transitory computer-readable storage medium storing thereon a computer program executed by at least one processor of a computer provided in an information processing device according to an embodiment of the present invention is summarized in that the at least one processor executes, in accordance with the program, processing including: in response to information of a first category to which first notification information to be notified to a user belongs being acquired, storing the first category as display target information; in response to information of a category to which second notification information, different from the first notification information, being acquired at a timing after the information of the first category is acquired, and if the category to which the second notification information belongs is the first category, storing the first category as the display target information; and in response to the information of the category to which the second notification information being acquired at a timing after the information of the first category is acquired, and if the category to which the second notification information belongs is a second category different from the first category, storing the second category as the display target information.

BRIEF DESCRIPTION OF DRAWINGS

FIG. 4 is a conceptual diagram illustrating an example of a category and a display example in the electronic wristwatch of the present embodiment;

DETAILED DESCRIPTION

A. Configuration of Embodiment

Hereinafter, the best mode for carrying out the present invention will be described with reference to the drawings. However, various technically preferable limitations are given to the embodiments described below in order to carry out the present invention, but the scope of the invention is not limited to the following embodiments and the illustrated examples.

Conventionally, as in JP 2011-049801 A, there has been a technique of making a user aware information on the number of unread e-mails, the number of unopened e-mails, and the like. However, the user does not know the content of information acquired by an external device, which causes a problem that the user cannot reliably or efficiently recognize what kind of notification information there is. According to a notification system 100 of the present invention, it is possible to reliably and efficiently make the user aware of what kind of notification information has been acquired.

Figure 1:
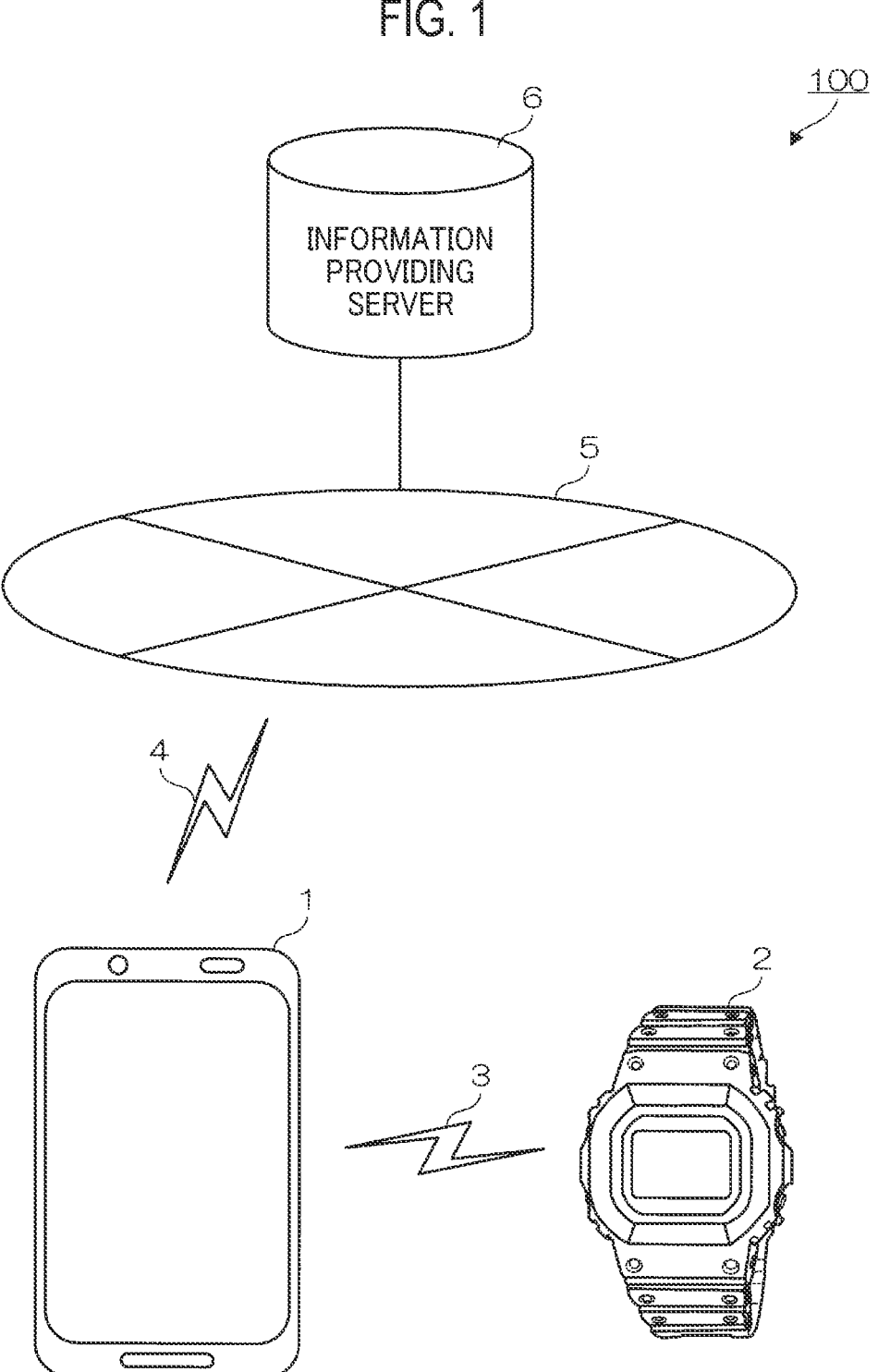
FIG. 1 is a block diagram illustrating a configuration of a notification system of the present embodiment.

FIG. 1 is a block diagram illustrating a configuration of the notification system 100 of the present embodiment.

The notification system 100 of the present embodiment includes an information terminal 1 such as a smartphone, an electronic wristwatch 2 as an external device, and an information providing server 6 on the Internet 5. The electronic wristwatch 2 (first external device) includes a watch main body and a band, and can be worn on an arm of the user. The information terminal 1 and the electronic wristwatch 2 can communicate with each other by short distance wireless 3 such as Bluetooth (registered trademark).

The information terminal 1 acquires at least one piece of new information (first notification information, second notification information) and category information (information on category) indicating a category to which the new information belongs from the information providing server 6 on the Internet 5 via a communication line 4, identifies a category (new information category: first category, second category) to which the acquired new information belongs, and registers (updates), as a display target, the category to which the new information to be notified belongs in display target information based on time of the new information acquisition or a priority order preset for each category. In response to a plurality of categories being registered as the display target in the display target information, the category of new information having the latest acquisition time and/or the category having the highest priority is a display target with top priority. Herein, the display target information is information to be displayed on a first external device.

Further, in the present embodiment, in an application of the information terminal 1, the user's birthday and the purchase (anniversary) date of the electronic wristwatch 2 are stored (set) as personal information (first notification information, second notification information). Every year, on the birthday or the purchase anniversary, the information terminal 1 acquires, with top priority, category information indicating a category to which the birthday information belongs or category information indicating a category to which the purchase anniversary information belongs, regardless of the priority of the new information, and registers, at a predetermined time (0:00) on that day, the category of the birthday information (personal category: first category, second category) or the category of the purchase anniversary information (personal category: first category, second category) as a display target with top priority in the display target information. In the present embodiment, for the birthday and the purchase anniversary, two notification methods are presented. A first method is a method of transmitting, instead of the category of the birthday or the anniversary, information (bitmap data) corresponding to a category of new information according to the priority of the new information (first embodiment). A second method is a method of continuously transmitting information (bitmap data) corresponding to the category of the birthday or the anniversary even when new information is acquired on the day of the birthday or the purchase anniversary or in the middle of the day (second embodiment). In the personal notification, in response to the birthday and the purchase (anniversary) date being the same day, the category of the purchase anniversary is registered (updated) in the display target information as the display target with top priority such that the birthday is given the top priority and the purchase anniversary is given the top priority for the next day.

When establishing a communication connection with the electronic wristwatch 2 at a fixed time within 24 hours a day (four times/day; 0:00, 6:00, 12:00, 18:00; first timing, second timing) preset in the electronic wristwatch 2, or in response to a connection request by manual operation by the user, the information terminal 1 transmits information (bitmap data) indicating a category registered as a display target with top priority in the display target information to the electronic wristwatch 2 according to the connection time (first timing or second timing).

In the present embodiment, in response to one category being registered as the display target in the display target information, the category is the display target with top priority. In response to a plurality of categories being registered as the display target, the first category (a category of the latest new information having the latest acquisition time and/or a category with the highest priority) is the display target with top priority and the second and subsequent categories are moved up in order under a predetermined condition to be set as the display target with top priority.

On the other hand, as described above, the electronic wristwatch 2 is automatically connected to the information terminal 1 by the short distance wireless 3 at the fixed time (0:00, 6:00, 12:00, 18:00), four times a day, or is connected to the information terminal 1 by the short distance wireless 3 by manual operation by the user to access the application being executed on the information terminal 1. When being connected to the information terminal 1, the electronic wristwatch 2 receives bitmap data, which is information indicating a category and transmitted from the application of the information terminal 1, and displays the bitmap data on a display unit. The electronic wristwatch 2 includes, as the display unit, a liquid crystal display of size: 5 (vertical)×17 (horizontal) dots (with vertical scrolling for 20 dots), and displays a character string representing a category on the liquid crystal display according to the bitmap data (character string, for example) received from the information terminal 1. Note that the connection at the fixed time (0:00, 6:00, 12:00, 18:00) is also for time adjustment of a clock unit.

Figure 2:
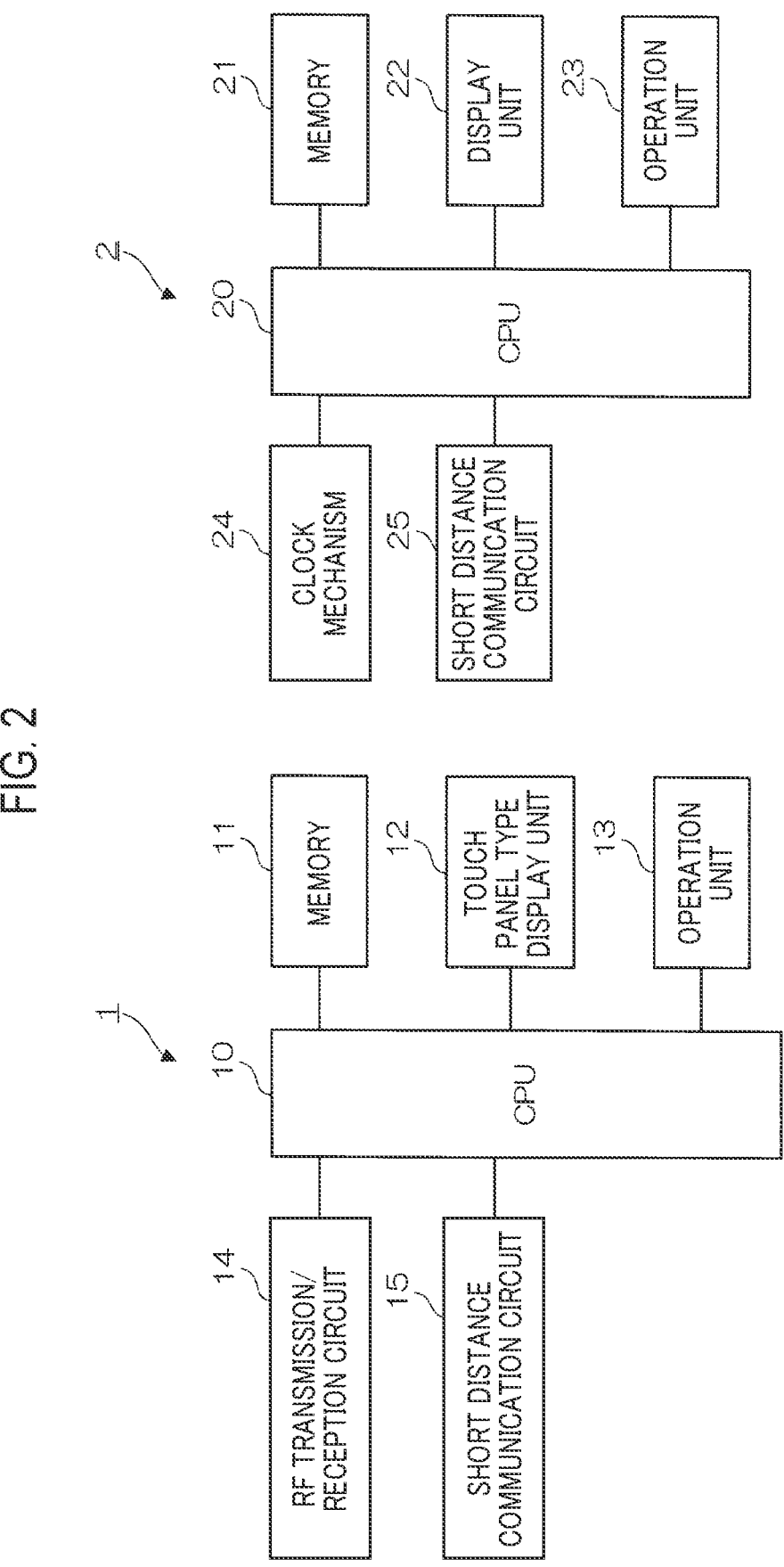
FIG. 2 is a block diagram illustrating a configuration of an information terminal and an electronic wristwatch of the present embodiment.

FIG. 2 is a block diagram illustrating a configuration of the information terminal 1 and an electronic wristwatch of the present embodiment. The information terminal 1 includes a CPU 10, a memory 11, a touch panel type display unit 12, an operation unit 13, an RF transmission/reception circuit 14, and a short distance communication circuit 15. The CPU 10 controls various operations of the information terminal 1 according to a program stored in the memory 11 (ROM). The CPU 10 may be a CPU, an ASIC, an FPGA, or the like. The CPU 10 may include two or more CPUs.

The CPU 10 operates as a determination unit that determines an input of a specific operation key of the operation unit 13 or an input of a touch operation (such as a finger touch) on the touch panel type display unit 12. The CPU 10 operates also as a processor that changes processing to be executed in accordance with the operation on a specific operation key or the touch operation.

The memory 11 stores a system program (not illustrated) that controls the entire operation of the information terminal 1, various application programs, and the like. In particular, the memory 11 stores a specific application related to the present embodiment.

The CPU 10 executes the specific application to thereby acquire new information and category information indicating a category to which the new information belongs from the information providing server 6, determine the category of the new information to be notified to the electronic wristwatch 2 based on time of the new information acquisition, a priority order set for each category to which the new information belongs, and the like, and register the category as the display target in the display target information. When a communication with the electronic wristwatch 2 is connected, the CPU 10 transmits, to the electronic wristwatch 2, information (bitmap data) indicating the category of the display target with top priority registered in the display target information.

The touch panel type display unit 12 has a structure in which a touch panel that detects a position touched by the user with a finger or the like and a display unit are integrated, and is configured by overlaying the touch panel on the display unit. The operation unit 13 includes various keys for the user to operate the information terminal 1, and in response to operation accepted, an input signal corresponding to the operation is transmitted to the CPU 10. The RF transmission/reception circuit 14 uses an RF transmission/reception antenna (not illustrated) to perform processing of telephone communication and e-mails transmission/reception performed with a mobile base station, and transmission/reception processing of packet communication related to acquisition of new information and the like from the information providing server 6. The short distance communication circuit 15 is a control module for performing a short distance communication (Bluetooth (registered trademark), for example) with an external device such as the electronic wristwatch 2.

The electronic wristwatch 2 includes a CPU 20, a memory 21, a display unit 22, an operation unit 23, a timing circuit 24, and a short distance communication circuit 25. The CPU 20 controls various operations of the electronic wristwatch 2 according to a program stored in the memory 21 (ROM). The CPU 20 may be a CPU, an ASIC, an FPGA, or the like. The CPU 20 displays the time on the display unit 22 based on the current time counted by the timing circuit 24. In addition, the CPU 20 receives information (bitmap data) indicating a category transmitted from the information terminal 1 via the short distance communication circuit 25, and displays the information on the display unit 22.

The memory 21 stores a system program (not illustrated) that controls the entire operation of the electronic wristwatch 2. The display unit 22 includes a liquid crystal display of size: 5 (vertical)×17 (horizontal) dots (with vertical scrolling for 20 dots), and displays the information (bitmap data; character string, for example) indicating a category received from the information terminal 1. The operation unit 23 includes various keys for the user to operate the electronic wristwatch 2, and in response to operation accepted, an input signal corresponding to the operation is transmitted to the CPU 20.

The timing circuit 24 is a counter that counts and holds the current time. The current time is read out and displayed on the display unit 22, or various operations are performed by comparing the current time data with setting time data related to various functions. The short distance communication circuit 25 is a control module for performing a short distance communication (Bluetooth (registered trademark), for example) with an external device such as the information terminal 1.

Figure 3:
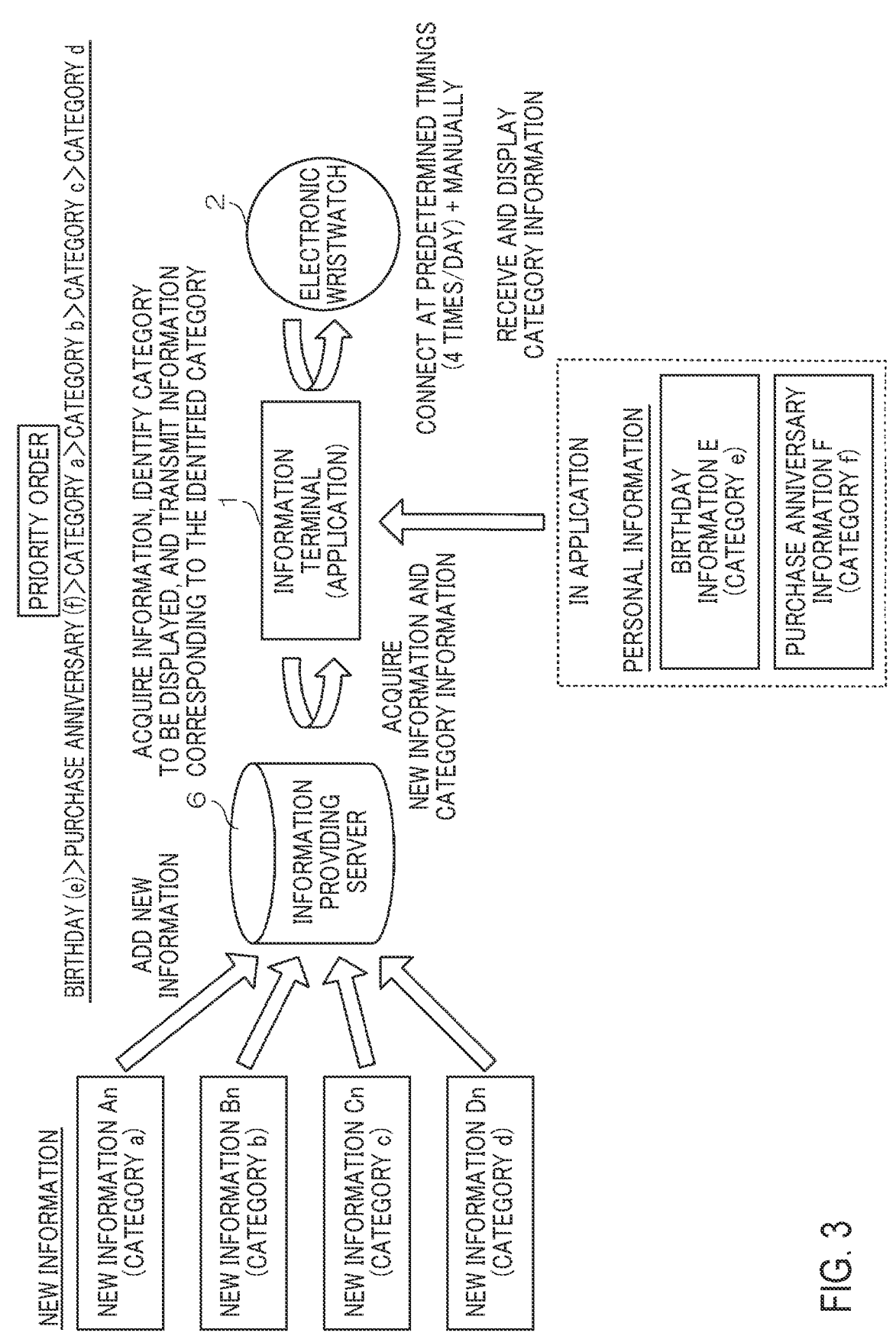
FIG. 3 is a conceptual diagram illustrating operation of acquiring new information and personal information and transmitting bitmap data to an electronic wristwatch by the notification system of the present embodiment.

FIG. 3 is a conceptual diagram illustrating operation of acquiring new information and category information, acquiring personal information, and transmitting bitmap data to the electronic wristwatch 2 by the notification system 100 of the present embodiment. As illustrated in FIG. 3, in the information providing server 6, various kinds of new information are provided from a company, an organization, and the like at any time, and stored. Examples of the new information include new information An, Bn, Cn, and Dn. In addition, the application of the information terminal 1 stores, as the personal information, birthday information E indicating the user's own birthday registered by the user at the time of installation or the like, and purchase anniversary information F indicating the purchase date of the electronic wristwatch 2.

The new information and the personal information are classified as categories according to characteristics (attributes) of the respective information. The new information An is classified as a category a, the new information Bn is classified as a category b, the new information Cn is classified as a category c, the new information Dn is classified as a category d, the birthday information E is classified as a category e (personal category), and the purchase anniversary information F is classified as a category f (personal category). In each category, a priority order is set as one of indices for determining whether to register (store) the information in the display target information as the display target. As illustrated, the priority order is set as follows: category e>category f>category a>category b>category c>category d.

As described above, when acquiring at least one piece of the new information An, Bn, Cn, and Dn and the corresponding category information from the information providing server 6, the application of the information terminal 1 identifies the categories a, b, c, and d to which the acquired pieces of new information An, Bn, Cn, and Dn belong respectively, determines the category of the display target based on the time of the pieces of new information An, Bn, Cn, and Dn acquisition and/or the priority order set to the categories a, b, c, and d to which the pieces of new information An, Bn, Cn, and Dn belong respectively, and registers (stores) the category in the display target information. Then, at the timing of connection to the electronic wristwatch 2, the application of the information terminal 1 transmits the bitmap data to the electronic wristwatch 2 as information indicating the category registered (stored) as the display target with top priority in the display target information. In addition, by setting the birthday information E and the purchase anniversary information F, which is the purchase date of the electronic wristwatch 2, to the highest priority, the application of the information terminal 1 registers (stores), on the day of the birthday or the purchase anniversary, the categories e and f of the personal information as the display target with top priority in the display target information, in priority over the new information described above. Therefore, regarding the personal information such as the birthday or the purchase anniversary, the bitmap data corresponding to the categories e and f is transmitted to the electronic wristwatch 2 at least at the timing (0:00) of a connection to the electronic wristwatch 2.

FIG. 4 is a conceptual diagram illustrating an example of a category and a display example in the electronic wristwatch 2 of the present embodiment. In the present embodiment, the new information An (category a) is 360° moving image information related to the electronic wristwatch 2, the new information Bn (category b) is new discovery information related to the electronic wristwatch 2, the new information Cn (category c) is event information related to the electronic wristwatch 2, and the new information Dn (category d) is new product information. In addition, the birthday information E (category e) indicates the user's birthday, and the purchase anniversary information F (category f) indicates the purchase date of the electronic wristwatch 2.

Then, bitmap data corresponding to a character string "360" indicating that it is 360° moving image information is set for the category a, bitmap data corresponding to a character string "DIS" (Discovery) indicating that it is new discovery information is set for the category b, bitmap data corresponding to a character string "CHK!" (Check!) indicating that it is event information is set for the category c, bitmap data corresponding to a character string "NEW!" indicating that it is new product information is set for the category d, bitmap data corresponding to a character string "HBD!" (Happy Birth Day) indicating that it is a birthday is set for the category e, and bitmap data corresponding to a character string "INKS" (Thanks) indicating that it is a purchase anniversary is set for the category f.

Figure 5:
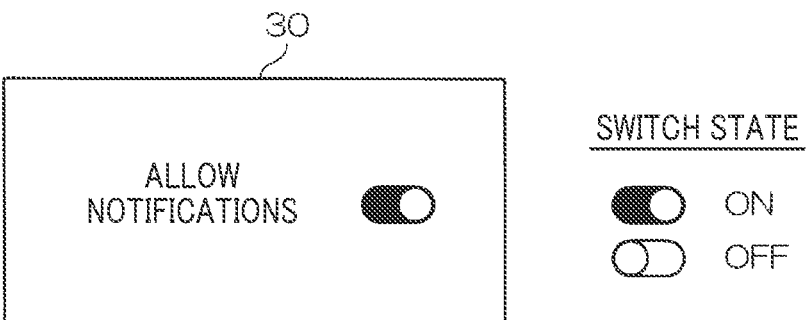
FIG. 5 is a schematic diagram illustrating a setting screen for whether to permit notification of new information and personal information in an application of the information terminal of the present embodiment.

FIG. 5 is a schematic diagram illustrating a setting screen 30 for whether to permit notification of new information and personal information in an application of the information terminal 1 of the present embodiment. In the present embodiment, the user can set, in the application of the information terminal 1, whether to notify the electronic wristwatch 2 of the bitmap data as the information indicating the categories to which the new information and the personal information belong. As illustrated in FIG. 5, as one of the application configuration functions, the setting screen 30 is provided for setting whether to perform notification of the bitmap data corresponding to the category. The user sets, on the setting screen 30, whether to allow the notification to the electronic wristwatch 2. In this manner, it is possible to turn on/off the notification corresponding to all the categories with a switch on one piece of software. Note that not only the notification corresponding to all the categories are turned on/off, but also on/off may be individually set for each category. This enables the user to select a category for which the user would like to receive notification.

In the present embodiment, whether to permit notification of notification (transmission of bitmap data) is set on the setting screen 30, but the present embodiment is not limited thereto. In the case of display on the electronic wristwatch 2, when the bitmap data corresponding to the category of the display target is transmitted, flag INFO "1" indicating whether to permit display may be transmitted. In the case of non-display on the electronic wristwatch 2, flag INFO "0" indicating whether to permit display may be transmitted together with the transmission of the bitmap data corresponding to the category a. The electronic wristwatch 2 displays the bitmap data received when the flag INFO indicating whether to permit display is "1", and does not display the bitmap data received when the flag INFO is "0".

First Embodiment

Figure 6:
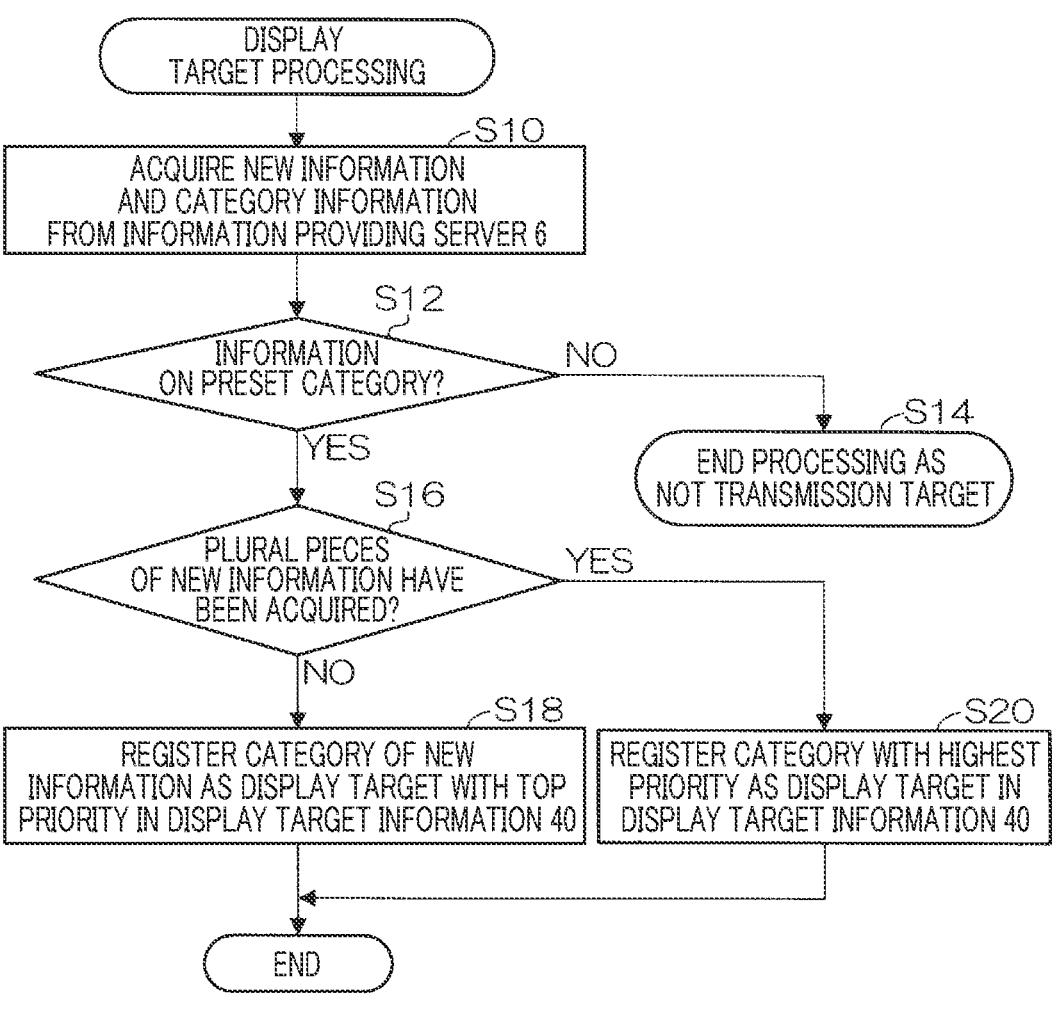
FIG. 6 is a flowchart depicting operation of an application executed by the information terminal of a first embodiment.
Figure 7:
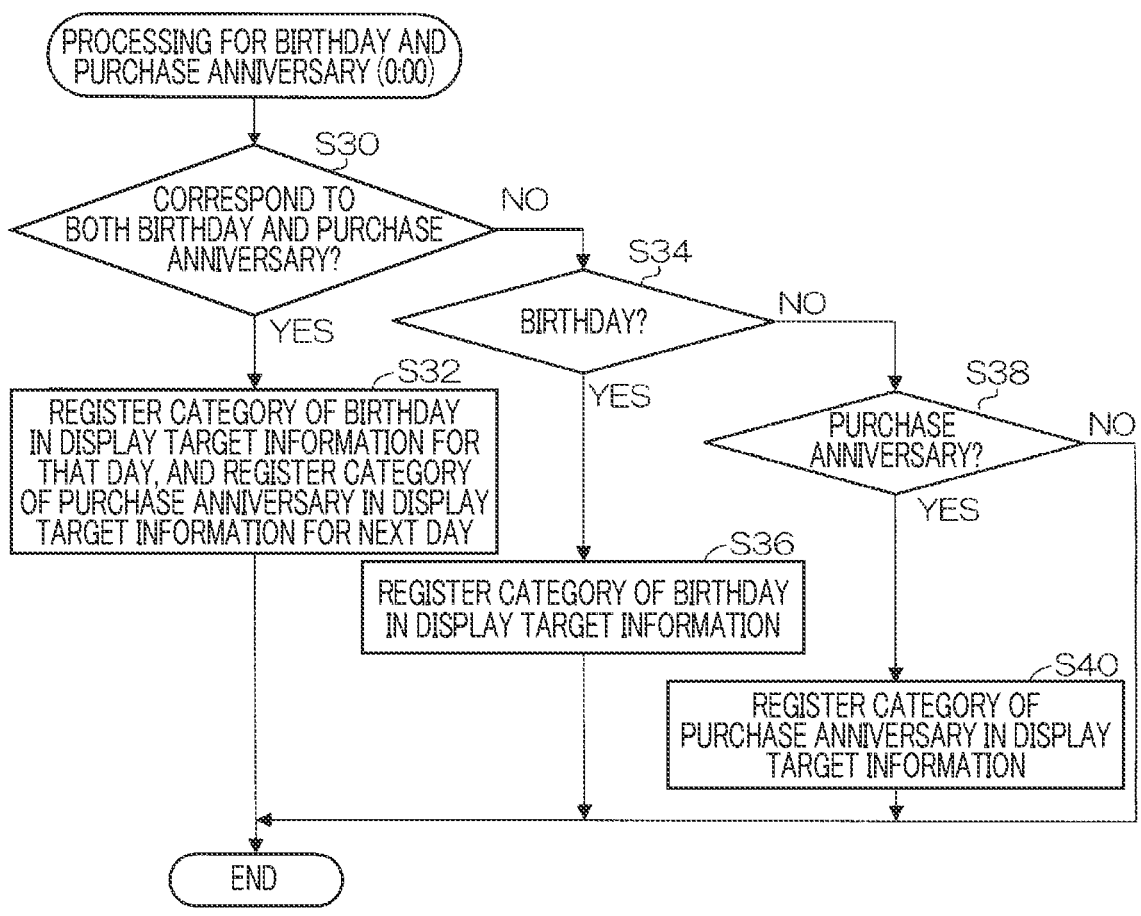
FIG. 7 is a flowchart depicting operation of an application executed by the information terminal of the first embodiment.
Figure 8:
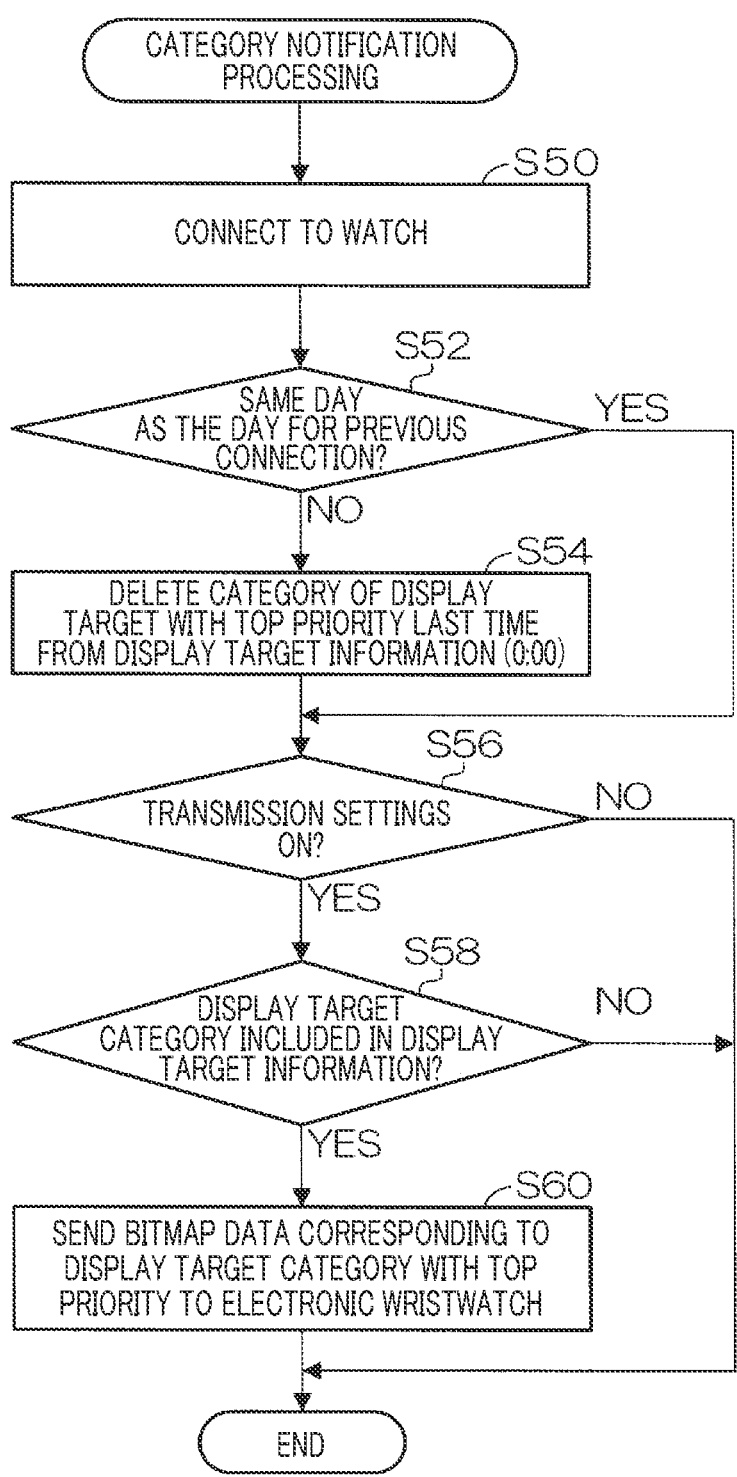
FIG. 8 is a flowchart depicting operation of an application executed by the information terminal of the first embodiment.

FIGS. 6 to 8 are flowcharts depicting operation of the information terminal 1 according to the first embodiment. FIG. 6 is a flowchart depicting display setting processing when the application of the information terminal 1 acquires notification information other than with respect to a birthday and a purchase anniversary from the server. The processing of the flowchart depicted in FIG. 6 is executed at a timing when the user activates the application (activate the AP) or at a timing when the user updates a home screen of the activated application by swiping the home screen downward (update the AP). First, the application of the information terminal 1 acquires new information and category information indicating a category to which the new information belongs from the information providing server 6 (step S10). Once activated, the application itself is constantly activated in the background, and in the background state, a connection to the information providing server 6 is not possible, and only a connection to the electronic wristwatch 2 is possible. The user activates the application, which makes it possible to connect to the information providing server 6 and acquire the new information and the category information. The state of activating the application corresponds to "activate the AP" or "update the AP" described above.

Next, the application determines whether the new information is information on a preset category based on the acquired category information (step S12). To be specific, the application determines whether the category to which the acquired new information belongs is any one of the categories a to d described above. Then, if the category of the acquired new information is none of the set categories a to d (NO in step S12), then it is determined not to be a target for transmission, and the processing ends (step S14).

On the other hand, if the category to which the acquired new information belongs is any one of the categories a to d described above (YES in step S12), then the application determines whether a plurality of pieces of new information has acquired (step S16). If a plurality of pieces of new information has not been acquired, namely, if only one piece of new information has been acquired (NO in step S16), then the category of the acquired new information is registered in display target information 40 as the display target with top priority (step S18). That is, every time new information is newly acquired, the information terminal 1 registers a category to which the new information belongs in the display target information 40 so as to be a notification target with top priority. Thereafter, the processing ends.

On the other hand, if a plurality of pieces of new information has been acquired (YES in step S16), then a category with the highest priority among the plurality of pieces of new information is registered as the display target with top priority in the display target information 40 (step S20). Further, (a category of) the new information with lower priority is discarded. Thereafter, the processing ends.

Next, processing for a case where notification information on a birthday and a purchase anniversary is acquired will be described with reference to FIG. 7. As illustrated in FIG. 7, at the time of fixed time connection with the electronic wristwatch 2 (0:00), the application of the information terminal 1 determines whether the current day corresponds to both the birthday and the purchase anniversary (step S30). In the first embodiment, in the category notification processing depicted in FIG. 8 to be described later, a category registered in the display target information 40 as of 0:00 is deleted to be in the empty state, and thus the flowchart depicted in FIG. 7 is executed thereafter.

If the current day corresponds to both the birthday and the purchase anniversary (YES in step S30), then the category e to which the birthday information E belongs is registered in the display target information as the display target with top priority for the current day, and the category f to which the purchase anniversary information F belongs is registered in the display target information 40 as the display target with top priority for the next day (step S32). Thereafter, the processing ends. Here, registering in the display target information 40 for the next day means that the category f to which the purchase anniversary information F belongs is temporarily held in the memory 11, and is registered in the display target information 40 as the display target with top priority at the time point of the next day (the time point of 0:00 of the next day).

On the other hand, if the current day does not correspond to both the birthday and the anniversary (NO in step S30), then it is determined whether the current day is the birthday (step S34). If the current day is the birthday (YES in step S34), then the category e to which the birthday information E belongs is registered in the display target information 40 as the display target with top priority (step S36). Thereafter, the processing ends.

On the other hand, if the current day is not the birthday (NO in step S34), then it is determined whether the current day is the purchase anniversary (step S38). If the current day is the purchase anniversary (YES in step S38), then the category f to which the purchase anniversary information F belongs is registered in the display target information 40 as the display target with top priority (step S40). Thereafter, the processing ends.

If the current day is neither the birthday nor the purchase anniversary (NO in step S38), then the processing ends.

As described above, in response to the current day being the birthday or the purchase anniversary, the categories e, f are registered in the display target information 40 as the display target with top priority, and when the electronic wristwatch 2 is connected at the fixed time (0:00) of the current day, the application of the information terminal 1 transmits information (bitmap data) indicating the category e, f to which the birthday or the purchase anniversary belongs to the electronic wristwatch 2 at least once a day.

Next, processing of transmitting bitmap data corresponding to a category to the electronic wristwatch 2 according to the display target information will be described with reference to FIG. 8. As described above, the electronic wristwatch 2 transmits a connection request to the information terminal 1 by the short distance communication circuit 25, four times a day, at the fixed time (0:00, 6:00, 12:00, 18:00) preset or at a timing of manual operation by the user. In response to the connection request, the application of the information terminal 1 similarly establishes a communication connection by the short distance communication circuit 15 (step S50).

Then, when the communication connection to the electronic wristwatch 2 is established by short distance communication, the application of the information terminal 1 determines whether or not the date on which the communication connection is established is the same day as the date on which the previous connection is established (step S52). If the date on which the communication connection is established is the same day as the date on which the previous connection is established (YES in step S52), if the transmission setting is ON (YES in step S56), and if a category as a display target with top priority is registered in the display target information 40 (YES in step S58), then information (bitmap data) indicating the category registered as the display target with top priority in the display target information 40 is transmitted to the electronic wristwatch 2 (step S60).

On the other hand, if the date on which the communication connection is established is not the same day as the date of the previous connection, that is, if the date of the previous connection is the previous day (NO in step S52), then the category registered as the display target with top priority last time is deleted from the display target information 40 (step S54). That is, in response to the date being exceeded, the category registered in the display target information 40 as the display target with top priority on the previous day is deleted to thereby empty the display target information 40. In this case, since the display target information 40 is empty (NO in step S58), the processing ends without transmitting the bitmap data to the electronic wristwatch 2.

Figure 9:
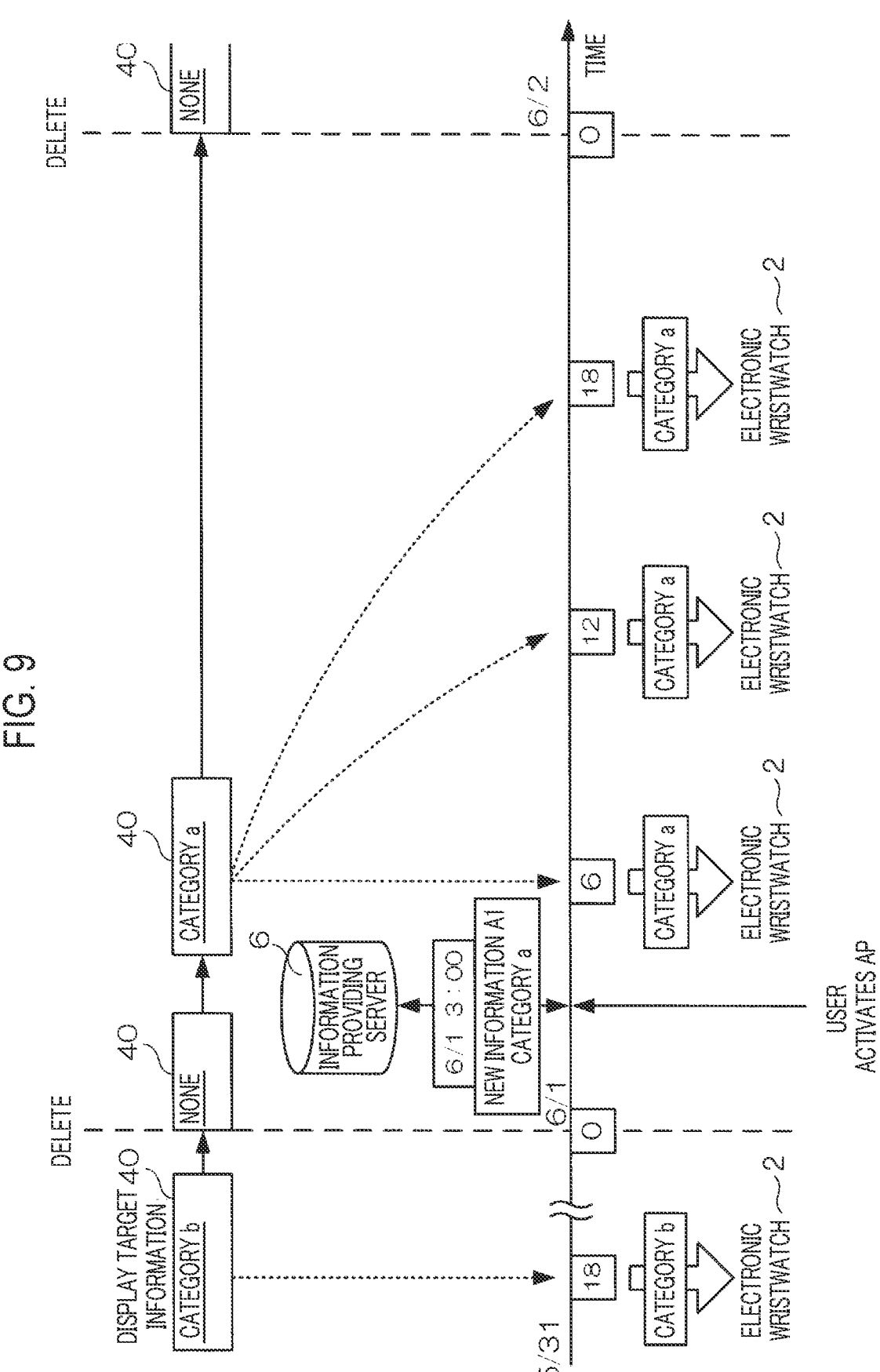
FIG. 9 is a conceptual diagram for explaining operation of an application executed by the information terminal of a first aspect in the first embodiment (case where one piece of new information is acquired during 24 hours)

FIG. 9 is a conceptual diagram for explaining operation of an application executed by the information terminal 1 of a first aspect in the first embodiment (case where one piece of new information is acquired during 24 hours). Referring to FIG. 9, the transition of the category registered in the display target information 40 is illustrated in the top row, the category transmitted from the information terminal 1 to the electronic wristwatch 2 at the fixed time (0→0:00, 6→6:00, 12→12:00, 18→18:00) connected to the electronic wristwatch 2 is illustrated in the bottom row, the operation of acquiring new information from the information providing server 6 is illustrated in the middle row, and the transmission of the information indicating the category is illustrated by the dotted arrow.

As illustrated in FIG. 9, first, assuming that the category b is registered as the display target with top priority in the display target information 40 on May 31, information (bitmap data) of the category b registered as the display target with top priority in the display target information 40 is transmitted to the electronic wristwatch 2 at the fixed time (18:00) on May 31. The display unit 22 of the electronic wristwatch 2 displays "DIS" indicating that new information of the category b has been acquired.

Thereafter, at the fixed time (0:00) on June 1, when being connected to the electronic wristwatch 2, the application of the information terminal 1 deletes the category b registered in the display target information 40 and empties the display target information 40 (step S54 in FIG. 8). At this time, since the display target information 40 is empty, no information (bitmap data) on a category is transmitted to the electronic wristwatch 2.

Next, at the fixed time (3:00) on June 1, the application of the information terminal 1 is activated by the user, which triggers acquisition of new information A1 and category information (category a) from the information providing server 6. In the diagram, the acquisition date and time is indicated in an upper rectangle, and the new information and the category information acquired is indicated in a lower rectangle. In this case, the category a to which the new information A1 belongs is registered as the display target with top priority in the display target information 40 (See NO in step S16 and step S18 in FIG. 6). Therefore, if new information is not newly acquired thereafter, at the fixed time connection with the electronic wristwatch 2 (6:00, 12:00, 18:00), every time the information terminal 1 is connected, information (bitmap data) indicating the category a to which the new information A1 belongs is repeatedly transmitted from the application to the electronic wristwatch 2 (see step S60 in FIG. 8). That is, in a period (predetermined period: 3:00 to 24:00) from the time the category a is registered as the display target with top priority in the display target information 40 until the date changes, the information (bitmap data) indicating the category a is repeatedly transmitted to the electronic wristwatch 2 every time the communication connection between the information terminal 1 and the electronic wristwatch 2 is established. Therefore, the display unit 22 of the electronic wristwatch 2 displays the character string "360" indicating that the new information of the category a has been acquired each time the electronic wristwatch 2 is connected to the information terminal 1. After 18:00, in response to the user manually establishing the connection, the information (bitmap data) indicating the category a registered as the display target with top priority is sometimes transmitted from the information terminal 1 to the electronic wristwatch 2.

Thereafter, when being connected to the electronic wristwatch 2 at the fixed time (0:00) on June 2 without newly receiving new information, the application of the information terminal 1 deletes the category a registered as the display target with top priority in the display target information 40 and empties the display target information 40 (step S54 in FIG. 8). At this time, since the display target information 40 is empty, no information (bitmap data) on a category is transmitted to the electronic wristwatch 2.

As described above, in response to only one piece of new information being acquired during the predetermined period, in other words, in response to new information being not newly acquired in the middle of the predetermined period, the information (bitmap data) indicating the category to which the new information, acquired first after 0:00, belongs is repeatedly transmitted to the electronic wristwatch 2, which makes it possible to reliably and efficiently make the user aware of what kind of new information has been acquired.

Figure 10:
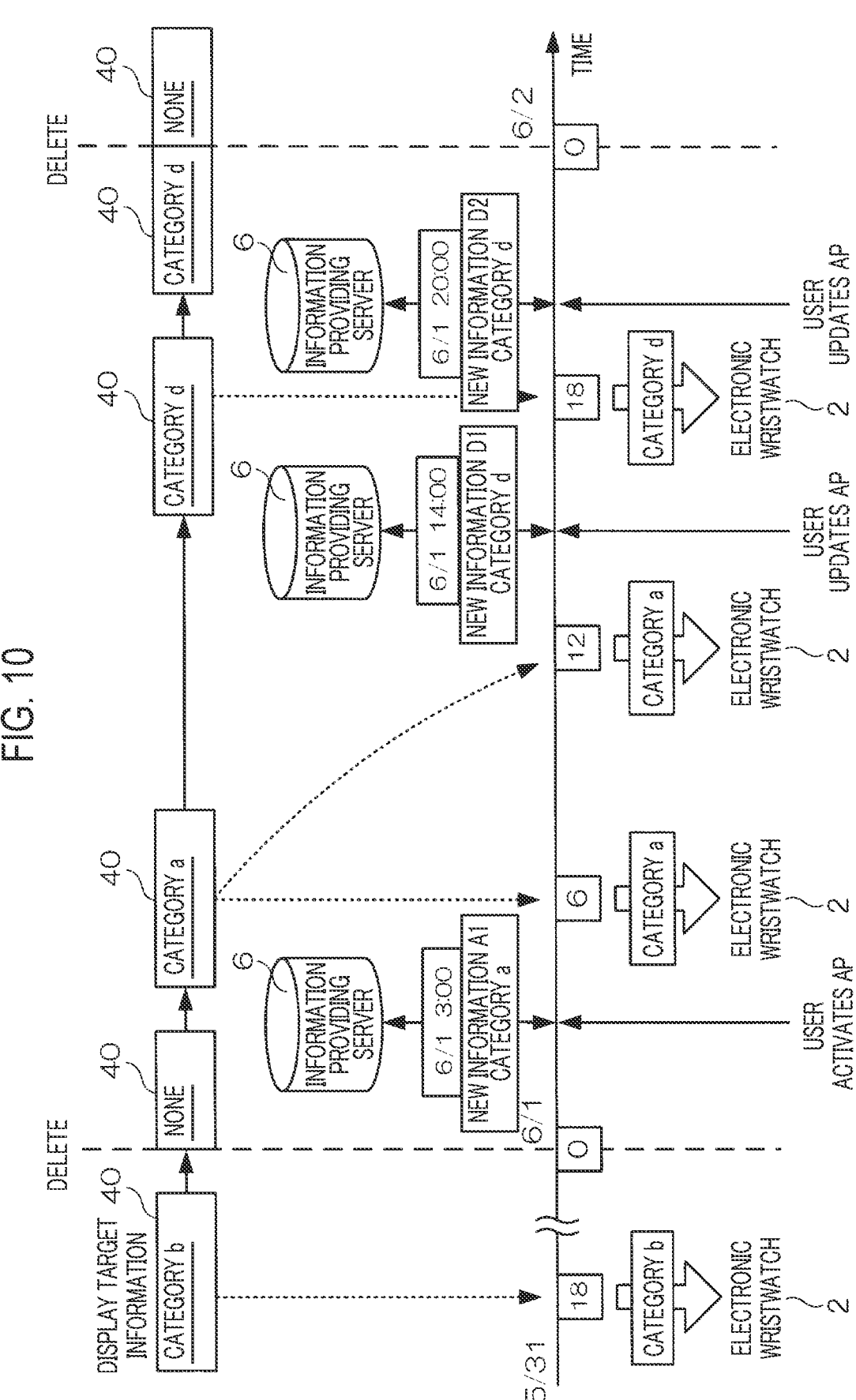
FIG. 10 is a conceptual diagram for explaining operation of an application executed by the information terminal of a second aspect in the first embodiment (case where a plurality of pieces of new information is newly acquired during 24 hours)

FIG. 10 is a conceptual diagram for explaining operation of an application executed by the information terminal 1 of a second aspect in the first embodiment (case where a plurality of pieces of new information is newly acquired during 24 hours). As illustrated in FIG. 10, first, assuming that the category b is registered as the display target with top priority in the display target information 40 on May 31, information (bitmap data) of the category b registered in the display target information 40 is transmitted to the electronic wristwatch 2 at the fixed time (18:00) on May 31. The display unit 22 of the electronic wristwatch 2 displays the character string "DIS" indicating that the new information of the category b has been acquired. Thereafter, at the fixed time (0:00) on June 1, when being connected to the electronic wristwatch 2, the application of the information terminal 1 deletes the category b registered in the display target information 40 and empties the display target information 40 (step S54 in FIG. 8). At this time, since the display target information 40 is empty, no information (bitmap data) on a category is transmitted to the electronic wristwatch 2.

Next, at 3:00 on June 1, the application of the information terminal 1 is activated by the user, which triggers acquisition of new information A1 and category information (category a) from the information providing server 6. In this case, the category a to which the new information A1 belongs is registered as the display target with top priority in the empty display target information 40 (See NO in step S16 and step S18 in FIG. 6). Thereafter, if new information is not newly acquired by the fixed time connection (6:00), then, at the fixed time connection (6:00), the information (bitmap data) indicating the category a registered as the display target with top priority in the display target information 40 is transmitted. Further, if new information is not newly acquired by the fixed time connection (12:00), then, at the fixed time connection (12:00), the information (bitmap data) indicating the category a registered as the display target in the display target information 40 is transmitted again. That is, in a period (predetermined period: 3:00 to 14:00) from the time the category a is registered as the display target with top priority in the display target information 40 until new information is newly acquired, the information (bitmap data) indicating the category a is repeatedly transmitted to the electronic wristwatch 2 every time the communication connection between the information terminal 1 and the electronic wristwatch 2 is established. Therefore, at the fixed time connection (6:00, 12:00), the display unit 22 of the electronic wristwatch 2 displays the character string "360" indicating that the new information of the category a has been acquired.

Thereafter, when the application is updated by user operation or the like at 14:00 on June 1, the application of the information terminal 1 acquires new information D1 and category information (category d) from the information providing server 6. In this case, instead of the category a which has been already registered in the display target information 40, the category d to which the new information D1 newly acquired belongs is registered (overwritten) as the display target with top priority in the display target information 40 (See NO in step S16 and step S18 in FIG. 6). Accordingly, thereafter, if new information is not newly acquired, the information (bitmap data) indicating the category d registered as the display target in the display target information 40 is transmitted from the application to the electronic wristwatch 2 at the fixed time connection with the electronic wristwatch 2 (18:00). The display unit 22 of the electronic wristwatch 2 displays the character string "NEW!" indicating that the new information of the category d has been acquired.

Thereafter, when the application is updated again by user operation or the like at 20:00 on June 1, the application of the information terminal 1 acquires new information D2 and category information (category d) from the information providing server 6. In this case, since the category d to which the new information D2 newly acquired belongs has already been registered as the display target information 40, the category registered in the display target information 40 is not changed (updated). Therefore, only one category d is registered in the display target information 40. In a period (predetermined period: 14:00 to 24:00) from the time the category d is registered as the display target with top priority in the display target information 40 until the date changes, the information (bitmap data) indicating the category d is repeatedly transmitted to the electronic wristwatch 2 every time the communication connection between the information terminal 1 and the electronic wristwatch 2 is established. After 18:00, in response to the user manually establishing the connection, the information (bitmap data) indicating the category d registered as the display target with top priority is sometimes transmitted from the information terminal 1 to the electronic wristwatch 2.

Thereafter, at the fixed time (0:00) on June 2, when being connected to the electronic wristwatch 2, the application of the information terminal 1 deletes the category d registered in the display target information 40 and empties the display target information 40 (step S54 in FIG. 8). At this time, since the display target information 40 is empty, no information (bitmap data) on a category is transmitted to the electronic wristwatch 2.

As described above, in response to new information being newly acquired during the predetermined period, a category to which the new information newly acquired belongs is registered (overwritten) in the display target information 40 as the display target with top priority. Therefore, every time new information is newly acquired, information (bitmap data) indicating a category to which that new information belongs is transmitted to the electronic wristwatch 2. As a result, it is possible to reliably and efficiently make the user aware of what kind of new information has been acquired each time new information is newly acquired.

Figure 11:
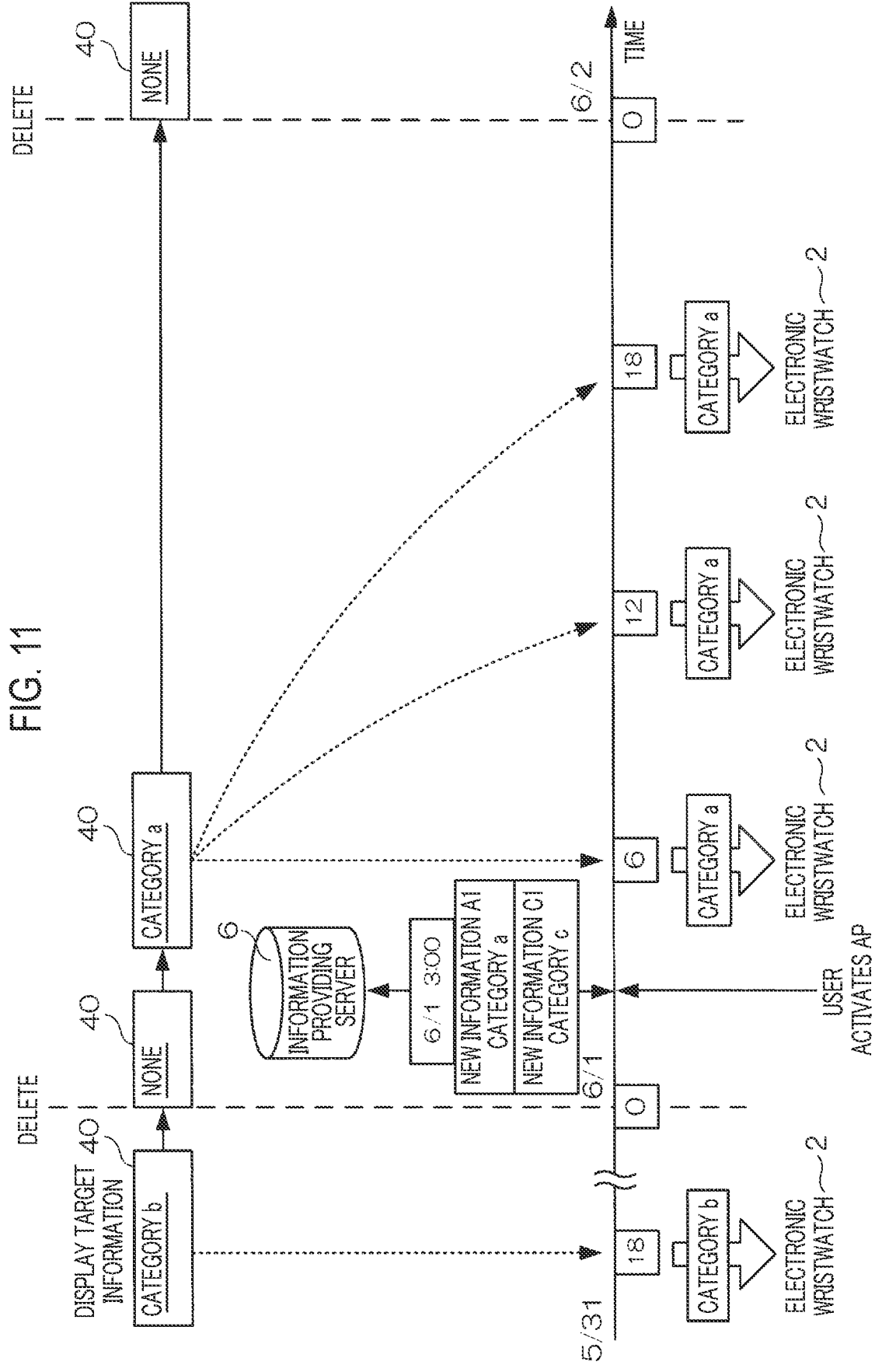
FIG. 11 is a conceptual diagram for explaining operation of an application executed by the information terminal of a third aspect in the first embodiment (case where a plurality of pieces of new information is acquired at the same time)

FIG. 11 is a conceptual diagram for explaining operation of an application executed by the information terminal 1 of a third aspect in the first embodiment (case where a plurality of pieces of new information is newly acquired at the same time). As illustrated in FIG. 11, first, assuming that the category b is registered as the display target with top priority in the display target information 40 on May 31, information (bitmap data) of the category b registered in the display target information 40 is transmitted to the electronic wristwatch 2 at the fixed time (18:00) on May 31. The display unit 22 of the electronic wristwatch 2 displays the character string "DIS" indicating that the new information of the category b has been acquired. Thereafter, at the fixed time (0:00) on June 1, when being connected to the electronic wristwatch 2, the application of the information terminal 1 deletes the category b registered in the display target information 40 and empties the display target information 40 (step S54 in FIG. 8). At this time, since the display target information 40 is empty, no information (bitmap data) on a category is transmitted to the electronic wristwatch 2.

Next, at 3:00 on June 1 for example, the application of the information terminal 1 is activated by the user, which triggers acquisition of new information A1 and category information (category a) and new information C1 and category information (category c) from the information providing server 6. As described above, in response to a plurality of pieces of new information being acquired at the same time, a category with higher priority is set as a notification target. In this case, since the order of priority of the category a of the new information A1 is higher than that of the category c of the new information C1, only the category a of the new information A1 is registered (overwritten) as the display target with top priority in the display target information 40 (See NO in step S16 and step S18 in FIG. 6). Accordingly, thereafter, if new information is not newly acquired, the information (bitmap data) indicating the category d registered as the display target in the display target information 40 is transmitted from the application to the electronic wristwatch 2 at the fixed time connection with the electronic wristwatch 2 (18:00). The display unit 22 of the electronic wristwatch 2 displays the character string "NEW!" indicating that the new information of the category d has been acquired.

Thereafter, when the application is updated again by user operation or the like at 20:00 on June 1, the application of the information terminal 1 acquires new information D2 and category information (category d) from the information providing server 6. In this case, since the category d to which the new information D2 newly acquired belongs has already been registered as the display target information 40, the category registered in the display target information 40 is not changed (updated). Therefore, only one category d is registered in the display target information 40. In a period (predetermined period: 14:00 to 24:00) from the time the category d is registered as the display target with top priority in the display target information 40 until the date changes, the information (bitmap data) indicating the category d is repeatedly transmitted to the electronic wristwatch 2 every time the communication connection between the information terminal 1 and the electronic wristwatch 2 is established. After 18:00, in response to the user manually establishing the connection, the information (bitmap data) indicating the category d registered as the display target with top priority is sometimes transmitted from the information terminal 1 to the electronic wristwatch 2.

Thereafter, at the fixed time (0:00) on June 2, when being connected to the electronic wristwatch 2, the application of the information terminal 1 deletes the category d registered in the display target information 40 and empties the display target information 40 (step S54 in FIG. 8). At this time, since the display target information 40 is empty, no information (bitmap data) on a category is transmitted to the electronic wristwatch 2.

As described above, in response to new information being newly acquired during the predetermined period, a category to which the new information newly acquired belongs is registered (overwritten) in the display target information 40 as the display target with top priority. Therefore, every time new information is newly acquired, information (bitmap data) indicating a category to which that new information belongs is transmitted to the electronic wristwatch 2. As a result, it is possible to reliably and efficiently make the user aware of what kind of new information has been acquired each time new information is newly acquired.

FIG. 11 is a conceptual diagram for explaining operation of an application executed by the information terminal 1 of a third aspect in the first embodiment (case where a plurality of pieces of new information is acquired at the same time). As illustrated in FIG. 11, first, assuming that the category b is registered as the display target with top priority in the display target information 40 on May 31, information (bitmap data) of the category b registered in the display target information 40 is transmitted to the electronic wristwatch 2 at the fixed time (18:00) on May 31. The display unit 22 of the electronic wristwatch 2 displays the character string "DIS" indicating that the new information of the category b has been acquired. Thereafter, at the fixed time (0:00) on June 1, when being connected to the electronic wristwatch 2, the application of the information terminal 1 deletes the category b registered in the display target information 40 and empties the display target information 40 (step S54 in FIG. 8). At this time, since the display target information 40 is empty, no information (bitmap data) on a category is transmitted to the electronic wristwatch 2.

Next, at 3:00 on June 1 for example, the application of the information terminal 1 is activated by the user, which triggers acquisition of new information A1 and category information (category a) and new information C1 and category information (category c) from the information providing server 6. As described above, in response to a plurality of pieces of new information being acquired at the same time, a category with higher priority is set as a notification target. In this case, since the order of priority of the category a of the new information A1 is higher than that of the category c of the new information C1, only the category a of the new information A1 is registered as the display target with top priority in the display target information 40 (See step S20 in FIG. 6). Thereafter, if new information is not newly acquired, the information (bitmap data) indicating the category a is repeatedly transmitted from the application to the electronic wristwatch 2 at the fixed time connection with the electronic wristwatch 2 (6:00, 12:00, 18:00). That is, in a period (predetermined period: 3:00 to 24:00) from the time the category a is registered as the display target with top priority in the display target information 40 until the date changes, the information (bitmap data) indicating the category a is repeatedly transmitted to the electronic wristwatch 2 every time the communication connection between the information terminal 1 and the electronic wristwatch 2 is established. Therefore, the display unit 22 of the electronic wristwatch 2 repeatedly displays the character string "360" indicating that the new information of the category a has been acquired each time the electronic wristwatch 2 is connected to the information terminal 1. After 18:00, in response to the user manually establishing the connection, the information (bitmap data) indicating the category a registered as the display target with top priority is sometimes transmitted from the information terminal 1 to the electronic wristwatch 2.

As described above, in response to a plurality of pieces of new information being acquired at the same time, only a category with higher priority is registered in the display target information 40 as the display target with top priority according to the order of priority set to the category to which the new information belongs, and the information (bitmap data) indicating that category is transmitted to the electronic wristwatch 2. Therefore, it is possible to preferentially notify that the new information belonging to the category with higher priority has been acquired, and it is also possible to reliably and efficiently make the user aware of what kind of new information has been acquired.

Figure 12:
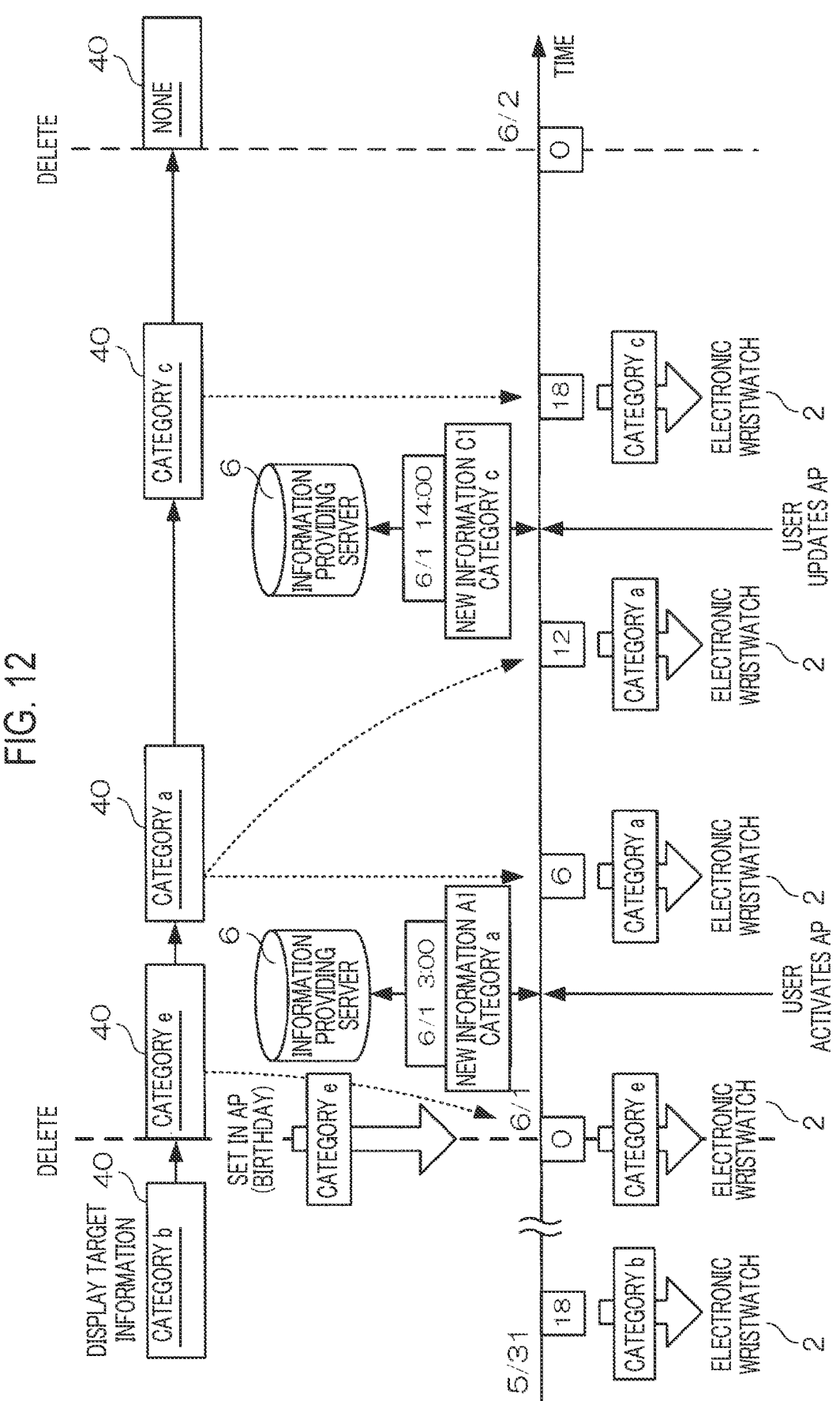
FIG. 12 is a conceptual diagram for explaining operation of an application executed by the information terminal of a fourth aspect in the first embodiment (personal information; case where the current day is a birthday)

FIG. 12 is a conceptual diagram for explaining operation of an application executed by the information terminal 1 of a fourth aspect in the first embodiment (personal information; case where the current day is a birthday). As illustrated in FIG. 12, as described above, at 0:00 at which the date changes (for example, at 0:00 at which the date changes from May 31 to June 1), the application deletes the category b registered in the display target information 40 and empties the display target information 40. Then, at 0:00, the application determines whether the current day (June 1) is the user's birthday. In response to the current day being the user's birthday, the category e to which the birthday information E belongs is registered in the display target information 40 as the display target with top priority (see step S36 in FIG. 7) because the birthday has the highest priority. In response to the current day being the user's birthday, at the fixed time connection with the electronic wristwatch 2 (0:00), information (bitmap data) indicating the category e for birthday is transmitted from the application to the electronic wristwatch 2 once a day, without exception. Thus, the character string "HBD!" indicating that the current day is the birthday is displayed on the display unit 22 of the electronic wristwatch 2.

In response to new information being not newly acquired after the fixed time connection (0:00), the information (bitmap data) indicating the category e for birthday is repeatedly transmitted also at the fixed time connection with the electronic wristwatch 2 (6:00, 12:00, 18:00), similarly to the case where one piece of new information is acquired (see FIG. 9). The "HBD!" indicating that the current day is the birthday is repeatedly displayed on the display unit 22 of the electronic wristwatch 2 every time a connection is made. As described above, in response to new information being not acquired on the birthday, the bitmap data (character string "HBD!") corresponding to the birthday is transmitted throughout the day. The same applies to the anniversary.

On the other hand, when the application is updated by user operation or the like at 3:00 on June 1, the application of the information terminal 1 acquires new information A1 and category information (category a) from the information providing server 6. In this case, instead of the category e, the category a to which the new information A1 belongs is registered as the display target with top priority in the display target information 40 (See NO in step S16 and step S18 in FIG. 6).

Thereafter, if new information is not newly acquired, the information (bitmap data) indicating the category a is trans- mitted from the application to the electronic wristwatch 2 at the fixed time connection with the electronic wristwatch 2 (6:00) because the category a is registered as the display target in the display target information 40. Further, if new information is not newly acquired by the fixed time con- nection (12:00), at the fixed time connection (12:00), the information (bitmap data) on the category a registered as the display target in the display target information 40 is trans- mitted again. Therefore, at the fixed time connection (6:00, 12:00), the display unit 22 of the electronic wristwatch 2 repeatedly displays the character string "360" indicating that the new information of the category a has been acquired.

Thereafter, when the application is updated by user opera- tion or the like at 14:00 on June 1, the application of the information terminal 1 acquires new information C1 and category information (category c) from the information providing server 6. In this case, instead of the category a, the category c to which the new information C1 belongs is registered (overwritten) as the display target with top prior- ity in the display target information 40 (See NO in step S16 and step S18 in FIG. 6). Therefore, the information (bitmap data) indicating the category c registered in the display target information 40 is transmitted from the application to the electronic wristwatch 2 at the fixed time connection with the electronic wristwatch 2 (18:00). After 18:00, in response to the user manually establishing the connection, the informa- tion (bitmap data) indicating the category c registered as the display target with top priority is sometimes transmitted from the information terminal 1 to the electronic wristwatch 2.

Thereafter, when being connected to the electronic wrist- watch 2 at the fixed time (0:00) on June 2 without newly acquiring new information, the application of the informa- tion terminal 1 deletes the category c registered in the display target information 40 and empties the display target information 40 (step S54 in FIG. 8). At this time, since the display target information 40 is empty, no information (bitmap data) on a category is transmitted to the electronic wristwatch 2.

As described above, according to the first embodiment, the application of the information terminal 1 is configured to register, in the case of a special day related to an individual user such as a birthday or a purchase anniversary, the category e to which the birthday information E belongs and the category f to which the purchase anniversary information F belongs as the display target with top priority in the display target information 40. Therefore, at least at 0:00 on that day, the information (bitmap data) indicating the cat- egory e, f is transmitted to the electronic wristwatch 2, and it is possible to reliably and efficiently make the user aware that it is the birthday or the purchase anniversary.

Second Embodiment

In the second embodiment, since the configurations of the information terminal 1 and the electronic wristwatch 2 are the same as described above, the description thereof will be omitted, and operations of the information terminal 1 and the electronic wristwatch 2 different from those of the first embodiment will be described. In the second embodiment, a category to be displayed is determined based on the order of priority set in advance to a category to which new informa- tion belongs, and the category is registered in the display target information 40 as the display target with top priority. To be specific, every time a connection with the electronic wristwatch 2 is made during 24 hours a day, a category with the highest priority among the new information acquired on that day is registered as a display target with top priority, and the bitmap data is transmitted to the electronic wristwatch 2 as information indicating the category that is the display target. In addition, in the second embodiment, even if new information is newly acquired in the middle of the day, the category that is the display target with top priority is not changed, and the category of the new information that is newly acquired is added to the display target information 40 according to the priority so as to be the next notification target with top priority. In the case of acquiring, as new information, new information that belongs to the same category as that of the new information already acquired, the category of the new information is combined with the category registered in the display target information 40 into one category, and the same category is not redundantly registered.

Figure 13:
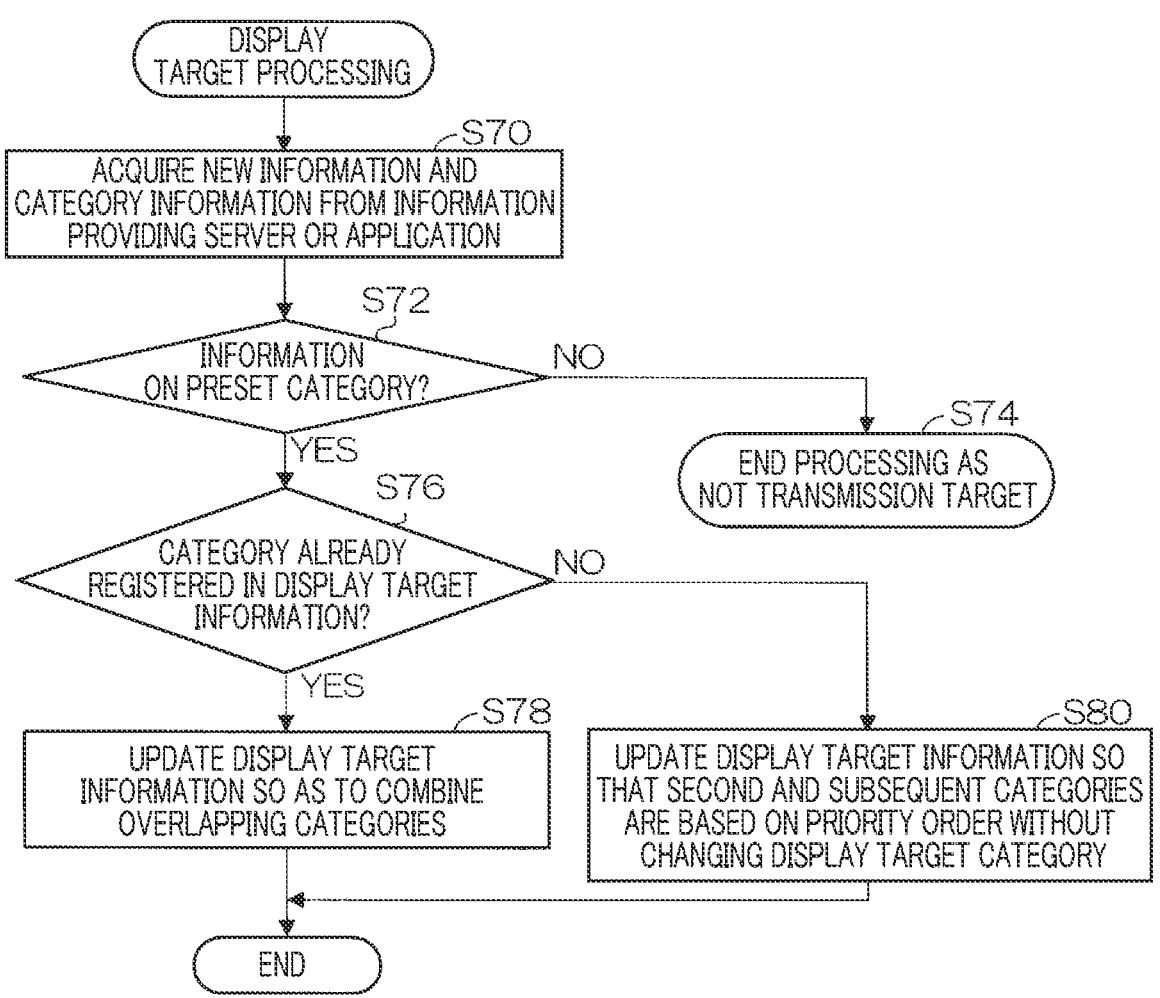
FIG. 13 is a flowchart depicting operation of an application executed by the information terminal of a second embodiment.

FIG. 13 is a flowchart depicting operation of an applica- tion executed by the information terminal 1 of the second embodiment. The processing of the flowchart depicted in FIG. 13 is executed at a timing when the user activates the application (activates the AP) or at a timing when the user updates a home screen of the activated application by swiping the home screen downward (update the AP). The application of the information terminal 1 first acquires, as new information, notification information from the informa- tion providing server 6 or personal information registered in the application, together with category information thereof (step S70).

Next, the application determines whether the new infor- mation acquired is information on a preset category based on the category information (step S72). To be specific, the application determines whether the category to which the acquired new information belongs is any one of the catego- ries a to f described above. Then, if the category of the acquired new information is none of the set categories a to f (NO in step S72), then it is determined not to be a target for transmission, and the processing ends (step S74). This is because the new information includes information that does not need to be notified, such as information on maintenance of the electronic wristwatch 2, in addition to the information classified by the category.

On the other hand, if the category to which the acquired new information belongs is any one of the categories a to f described above (YES in step S72), then the application determines whether the category of the acquired new infor- mation is a category already registered in the display target information 40 (step S76). Then, if the category of the acquired new information is the same as the category registered in the display target information 40 (YES in step S76), then the display target information 40 is updated so as to combine the overlapping categories into one (step S78). Thereafter, the processing ends.

On the other hand, if the category of the acquired new information is different from the category registered in the display target information 40 (NO in step S76), then the display target information 40 is updated such that the second and subsequent categories including the category of the new information are in the order based on the priority order, without changing the category registered as the display target with top priority (step S80). Thereafter, the processing ends.

Figure 14:
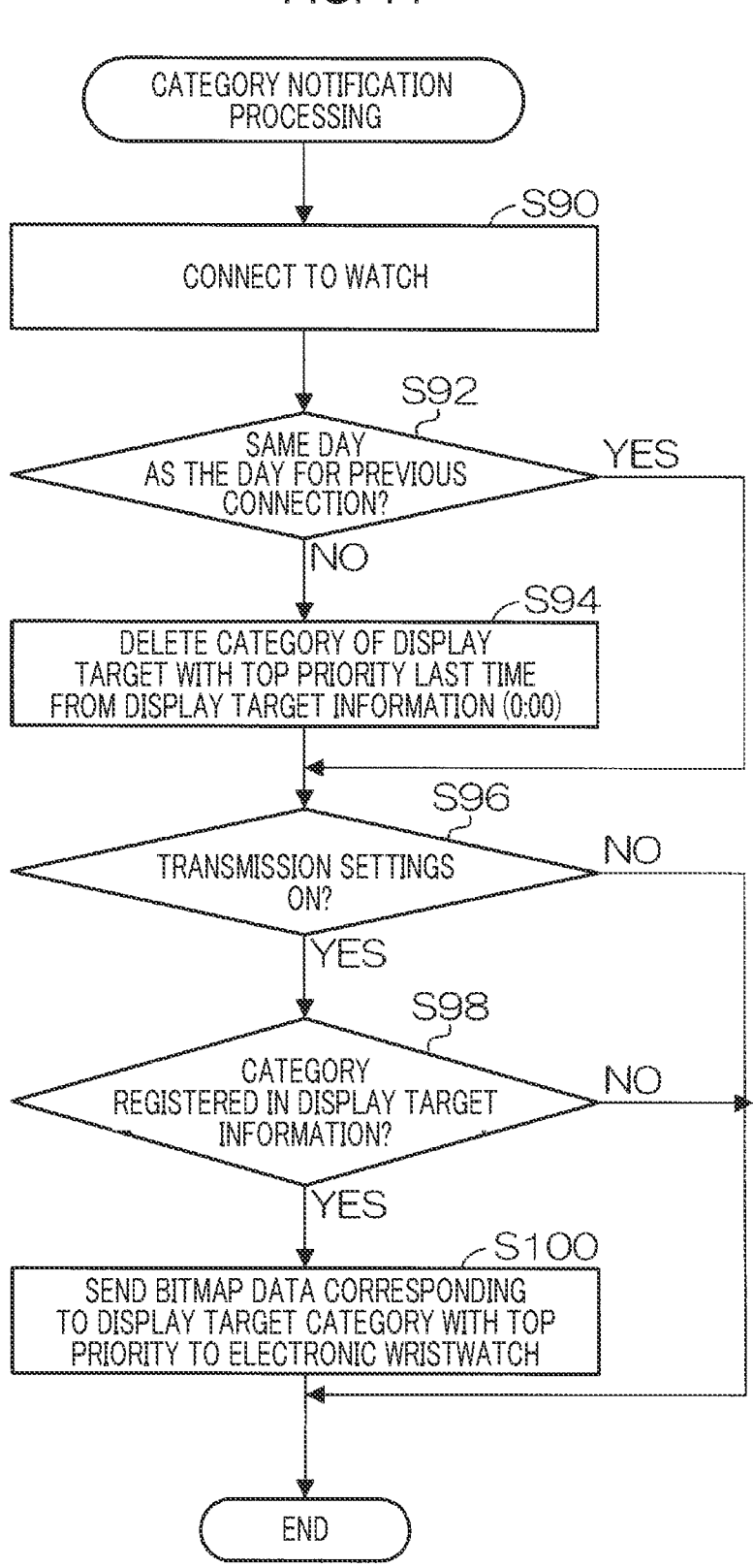
FIG. 14 is a flowchart depicting operation of an application executed by the information terminal of the second embodiment.

FIG. 14 is a flowchart depicting operation of an application executed by the information terminal 1 of the second embodiment. As described above, the electronic wristwatch 2 transmits a connection request to the information terminal 1 by the short distance communication circuit 25, four times during 24 hours a day, at a fixed time (0:00, 6:00, 12:00, 18:00) preset or at a timing of manual operation by the user. In response to the connection request, the application of the information terminal 1 similarly establishes a communication connection by the short distance communication circuit 15 (step S90).

Then, when the communication connection to the electronic wristwatch 2 is established, the application of the information terminal 1 determines whether it is the same day as the date of the previous connection (step S92). If the date on which the communication connection is established is the same day as the date of the previous connection (YES in step S92), if the transmission setting is ON (YES in step S96), and if a category of the display target is registered in the display target information 40 (YES in step S98), then information (bitmap data) indicating the category registered as the display target with top priority in the display target information 40 is transmitted to the electronic wristwatch 2 (step S100).

On the other hand, if the date on which the communication connection is established is not the same day as the date of the previous connection, that is, if the date of the previous connection is the previous day (NO in step S92), then the category registered as the display target with top priority last time is deleted from the display target information 40 (step S94). That is, in response to the date being exceeded, the category registered in the display target information 40 as the display target with top priority on the previous day is deleted. At this point, in response to one category being registered as the display target with top priority in the display target information 40, that one category is deleted. Accordingly, since the display target information 40 is empty (NO in step S98), the processing ends without transmitting the bitmap data to the electronic wristwatch 2.

On the other hand, in response to a plurality of categories being registered as the display target in the display target information 40, only the category registered as the display target with top priority is deleted. Therefore, the next (second) category registered as the display target is moved up to the display target with top priority. Accordingly, in this case, since the display target information 40 is not empty (YES in step S98), information (bitmap data) indicating the category that has newly become the display target with top priority is transmitted to the electronic wristwatch 2 (steps S100). Thereafter, the processing ends.

Figure 15:
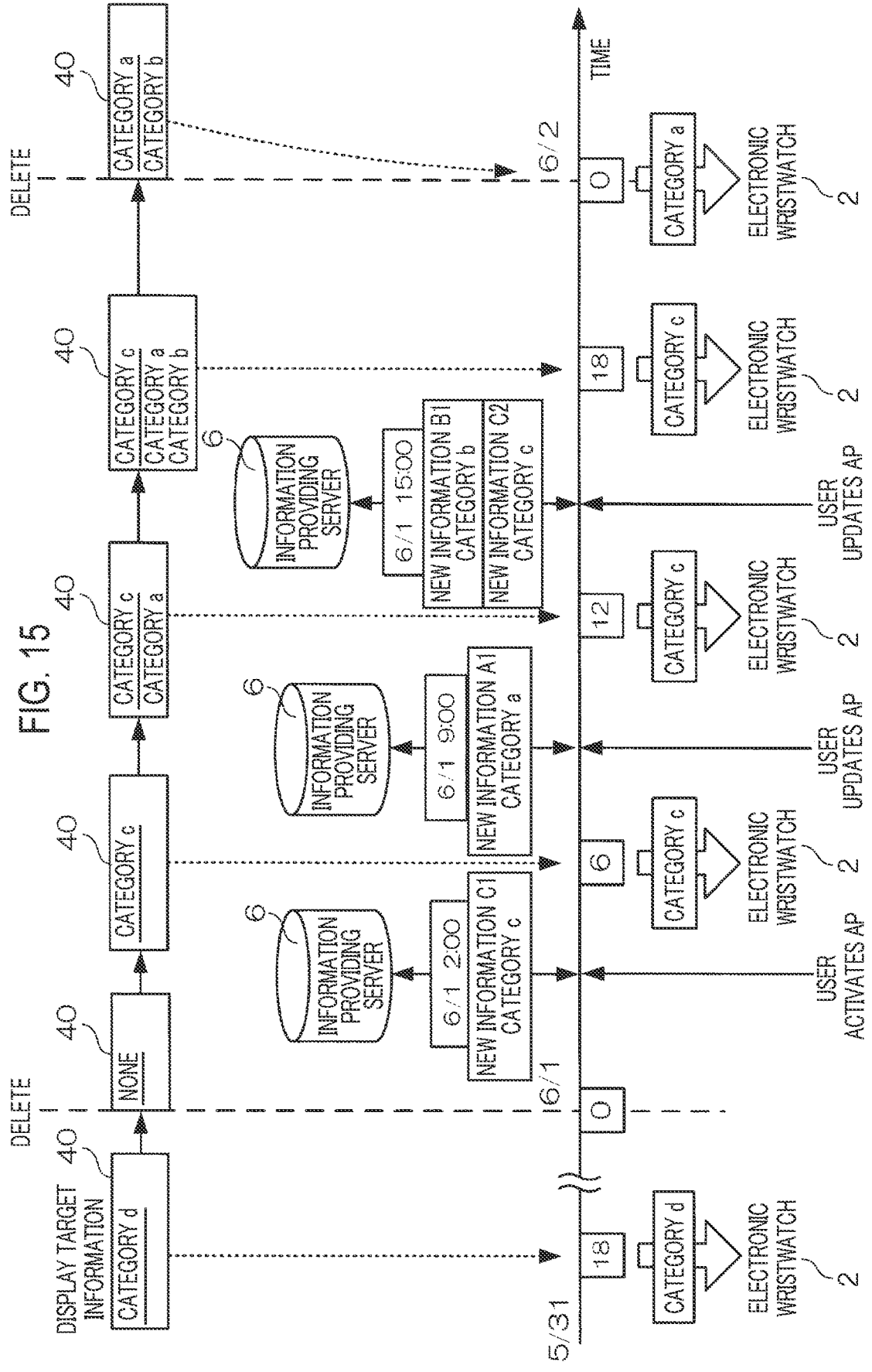
FIG. 15 is a conceptual diagram for explaining operation (first operation example of a case where, when a category with low priority is already registered in display target information, new information of a category with high priority and a category with lower priority is acquired in one day) of an application executed by the information terminal of a first aspect in the second embodiment.

FIG. 15 is a conceptual diagram for explaining operation (first operation example of a case where, when a category with low priority is already registered in the display target information 40, new information of a category with high priority and a category with lower priority is acquired in one day) of an application executed by the information terminal 1 of a first aspect in the second embodiment. As illustrated in FIG. 15, first, assuming that the category d is registered as the display target with top priority in the display target information 40 on May 31, information (bitmap data) of the category d registered in the display target information 40 is transmitted to the electronic wristwatch 2 at the fixed time (18:00) on May 31. The display unit 22 of the electronic wristwatch 2 displays "NEW!" indicating that new information of the category b has been acquired. Thereafter, at the fixed time (0:00) on June 1, when being connected to the electronic wristwatch 2, the application of the information terminal 1 deletes the category d registered in the display target information 40 and empties the display target information 40 (step S94 in FIG. 14). At this time, since the display target information 40 is empty, no information (bitmap data) on a category is transmitted to the electronic wristwatch 2.

Next, at 2:00 on June 1, the application of the information terminal 1 is activated by the user, which triggers acquisition of new information C1 and category information (category c) from the information providing server 6. In this case, the category c to which the new information C1 belongs is registered as the display target with top priority in the display target information 40. Thereafter, if new information is not newly acquired, the information (bitmap data) indicating the category c is transmitted from the application to the electronic wristwatch 2 at the fixed time connection with the electronic wristwatch 2 (6:00). The display unit 22 of the electronic wristwatch 2 displays the character string "CHK!" indicating that the new information of the category c has been acquired.

Thereafter, when the application is updated by user operation or the like at 9:00, the application of the information terminal 1 acquires new information A1 and category information (category a) from the information providing server 6. In this case, the category a to which the new information A1 belongs is not the category registered in the display target information 40 (see NO in step S76 in FIG. 13), the display target information 40 is updated such that the second and subsequent categories including the category a of the new information are in the order based on the priority order, without changing the category c corresponding to the display target with top priority (see step S80 in FIG. 13). In this case, as illustrated in the drawing, the display target information 40 is in the order of the category c, which is the display target with top priority, and then the category a. Thereafter, if new information is not newly acquired, the information (bitmap data) indicating the category c is transmitted again from the application to the electronic wristwatch 2 at the fixed time connection with the electronic wristwatch 2 (12:00). The display unit 22 of the electronic wristwatch 2 displays again the character string "CHK!" indicating that the new information of the category c has been acquired.

Then, when the application is updated by user operation or the like at 15:00 on June 1, the application of the information terminal 1 acquires new information B1 and category information (category b) as well as new information C2 and category information (category c) from the information providing server 6. In this case, since the category c to which the new information C2 belongs is a category already registered in the display target information 40 (see YES in step S76 in FIG. 13), the display target information 40 is updated so as to combine the overlapping categories c into one (see step S78 in FIG. 13). As a result, as illustrated in the drawing, the display target information 40 is in the order of the category c, which is the display target with top priority, and then the category a and the category b according to the priority.

Thereafter, the information (bitmap data) indicating the category c that is the display target with top priority is transmitted again from the application to the electronic wristwatch 2 at the fixed time connection with the electronic wristwatch 2 (18:00). The display unit 22 of the electronic wristwatch 2 displays again the character string "CHK!" indicating that the new information of the category c has been acquired. Accordingly, in a period (predetermined period: 2:00 to 24:00) from the time the category c is registered as the display target with top priority in the display target information 40 until the date changes, the information (bitmap data) indicating the category c is repeatedly transmitted to the electronic wristwatch 2 every time the communication connection between the information terminal 1 and the electronic wristwatch 2 is established. After 18:00, in response to the user manually establishing the connection, the information (bitmap data) indicating the category c registered as the display target with top priority is sometimes transmitted from the information terminal 1 to the electronic wristwatch 2.

Thereafter, when being connected to the electronic wristwatch 2 at the fixed time (0:00) on June 2 without newly receiving new information, the application of the information terminal 1 deletes the category c registered as the display target with top priority in the display target information 40 (step S94 in FIG. 14). As a result, as illustrated in the drawing, the next category a becomes the display target with top priority in the display target information 40. Accordingly, the information (bitmap data) indicating the category a is transmitted from the information terminal 1 to the electronic wristwatch 2 at the fixed time (0:00). The display unit 22 of the electronic wristwatch 2 displays the character string "360" indicating that the new information of the category a has been acquired.

As described above, in the first operation example, even in response to new information being first acquired after 0:00 and then new information of a category having priority higher than the category of the first acquired new information is acquired, the application of the information terminal 1 fixes the category of the first acquired new information as the prioritized display target, so that information indicating the category of the first acquired new information is repeatedly displayed on the display unit 22 of the electronic wristwatch 2 each time a connection to the information terminal 1 is made, which makes it possible to reliably and efficiently make the user aware of the category of the first acquired new information.

Figure 16:
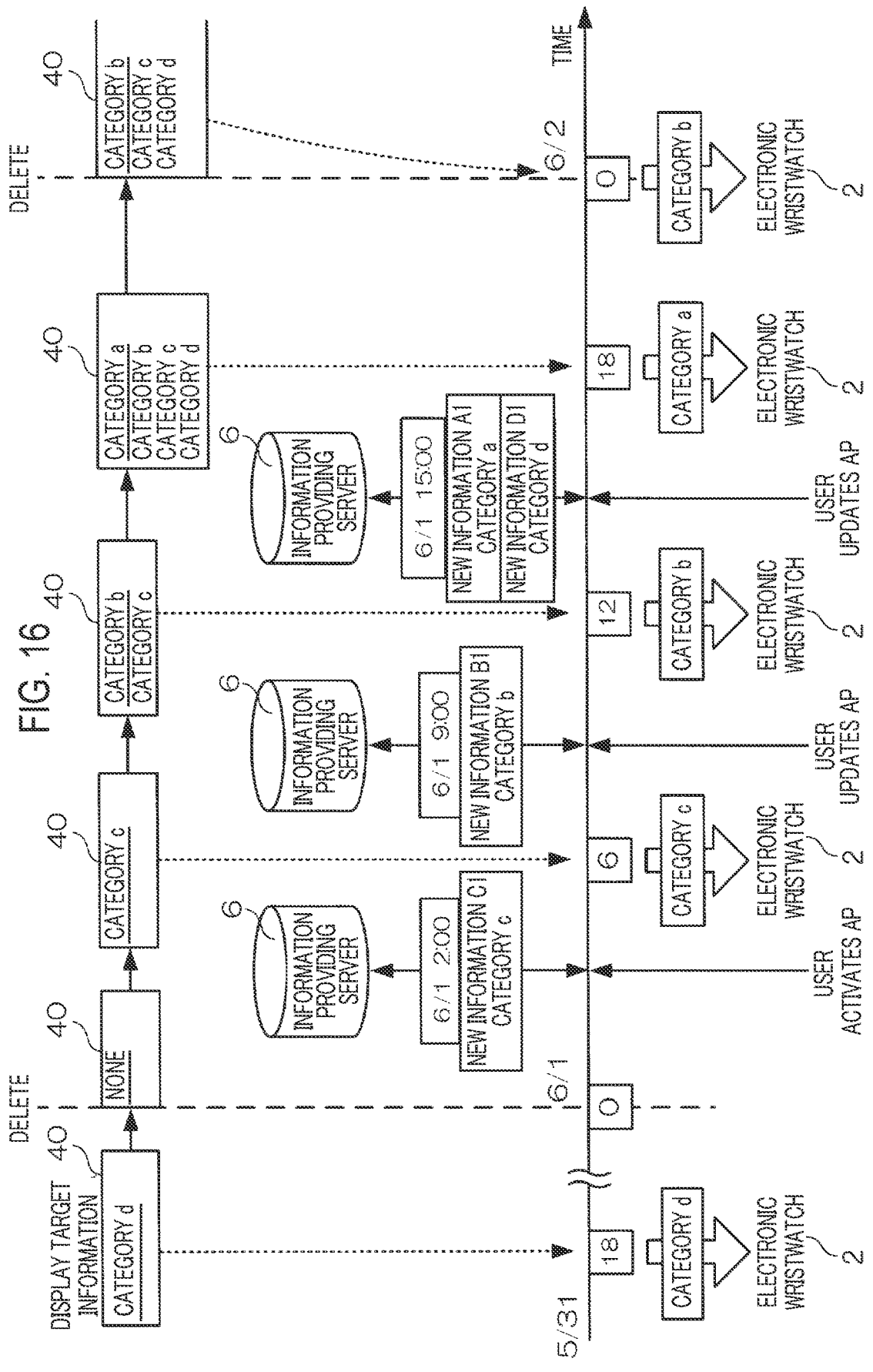
FIG. 16 is a conceptual diagram for explaining operation (second operation example of a case where, when a category with low priority is already registered in display target information, new information of a category with high priority and a category with lower priority is acquired in one day) of an application executed by the information terminal of a second aspect in the second embodiment.

FIG. 16 is a conceptual diagram for explaining operation (second operation example of a case where, when a category with low priority is already registered in the display target information 40, new information of a category with high priority and a category with lower priority is acquired in one day) of an application executed by the information terminal 1 of a second aspect in the second embodiment. As illustrated in FIG. 16, first, since the category d is registered as the display target with top priority in the display target information 40 on May 31, information (bitmap data) of the category d is transmitted to the electronic wristwatch 2 at the fixed time (18:00) on May 31. The display unit 22 of the electronic wristwatch 2 displays "NEW!" indicating that new information of the category b has been acquired. Thereafter, at the fixed time (0:00) on June 1, the application of the information terminal 1 deletes the category d registered in the display target information 40 and empties the display target information 40 (step S94 in FIG. 14). At this time, no information (bitmap data) on a category is transmitted to the electronic wristwatch 2.

Next, at 2:00 on June 1, the application of the information terminal 1 is activated by the user, which triggers acquisition of new information C1 and category information (category c) from the information providing server 6. In this case, the category c to which the new information C1 belongs is registered as the display target with top priority in the display target information 40. Thereafter, if new information is not newly acquired, the information (bitmap data) indicating the category c is transmitted from the application to the electronic wristwatch 2 at the fixed time connection with the electronic wristwatch 2 (6:00). The display unit 22 of the electronic wristwatch 2 displays the character string "CHK!" indicating that the new information of the category c has been acquired.

Thereafter, when the application is updated by user operation or the like at 9:00, the application of the information terminal 1 acquires new information B1 and category information (category b) from the information providing server 6. In this case, since the category b to which the new information B1 belongs is not a category registered as the display target in the display target information 40 (see NO in step S76 in FIG. 13), the category b is additionally registered in the display target information 40. At this time, in the second operation example, the order is determined according to the priority of all the categories in the display target information 40. In this case, the category b of the new information B1 newly acquired has higher priority than that of the category c already registered in the display target information 40. Thus, in the display target information 40, the category b that is the display target with top priority, and then the category c are registered in this order. In response to a category of new information being a category already registered in the display target information 40, the same categories are combined into one (see YES in step S76 and step S78 in FIG. 13). As described above, in the second operation example, the display target information 40 is updated such that all the categories registered in the display target information 40 including the category of the display target with top priority are in descending order of priority.

Thereafter, if new information is not newly acquired, the information (bitmap data) corresponding to the category b newly registered as the display target with top priority is transmitted from the application to the electronic wristwatch 2 at the fixed time connection with the electronic wristwatch 2 (12:00). The display unit 22 of the electronic wristwatch 2 displays the character string "DIS" indicating that the new information of the category b having the next highest priority has been acquired.

Then, when the application is updated by user operation or the like at 15:00 on June 1, the application of the information terminal 1 acquires new information A1 and category information (category a) as well as new information D1 and category information (category d) from the information providing server 6. In this case, since the category a to which the new information A1 belongs and the category d to which the new information D1 belongs are not registered in the display target information 40 (see NO in step S76 in FIG. 13), the categories a and d are additionally registered in the display target information 40. At this time, in the second operation example, as described above, the order is determined according to the priority of all the categories in the display target information 40. In this case, based on the order of priority of the categories b and c already registered in the display target information 40, the order of priority of the category a of the new information A1 newly acquired, and the order of priority of the category d of the new information D1 newly acquired, the category a that is the display target with top priority, the category b, the category c, and the category d are registered in the display target information 40 in this order.

Thereafter, if new information is not newly acquired, the information (bitmap data) indicating the category a of the new information A1 newly acquired is transmitted from the application to the electronic wristwatch 2 at the fixed time connection with the electronic wristwatch 2 (18:00). The display unit 22 of the electronic wristwatch 2 displays the character string "360" indicating that the new information of the category a has been acquired. After 18:00, in response to the user manually establishing the connection, the information (bitmap data) indicating the category a registered as the display target with top priority is sometimes transmitted from the information terminal 1 to the electronic wristwatch 2.

Thereafter, when being connected to the electronic wristwatch 2 at the fixed time (0:00) on June 2 without newly receiving new information, the application of the information terminal 1 deletes the category a that is the display target with top priority registered in the display target information 40 (step S94 in FIG. 14). As a result, as illustrated in the drawing, the next category b becomes the display target with top priority in the display target information 40. Accordingly, the information (bitmap data) indicating the category b is transmitted from the information terminal 1 to the electronic wristwatch 2 at the fixed time (0:00). The display unit 22 of the electronic wristwatch 2 displays the character string "DIS" indicating that the new information of the category b has been acquired.

As described above, in the second operation example, in response to new information with high priority being newly acquired after 0:00 of a predetermined period, the application of the information terminal 1 determines the order according to the priority of all the categories in the display target information 40 including the category already registered, so that the category with top priority is set as the display target. As a result, in response to new information with high priority having been acquired, the display unit 22 of the electronic wristwatch 2 can reliably and efficiently make the user aware that the new information with high priority has been acquired each time the electronic wristwatch 2 is connected to the information terminal 1.

Figure 17:
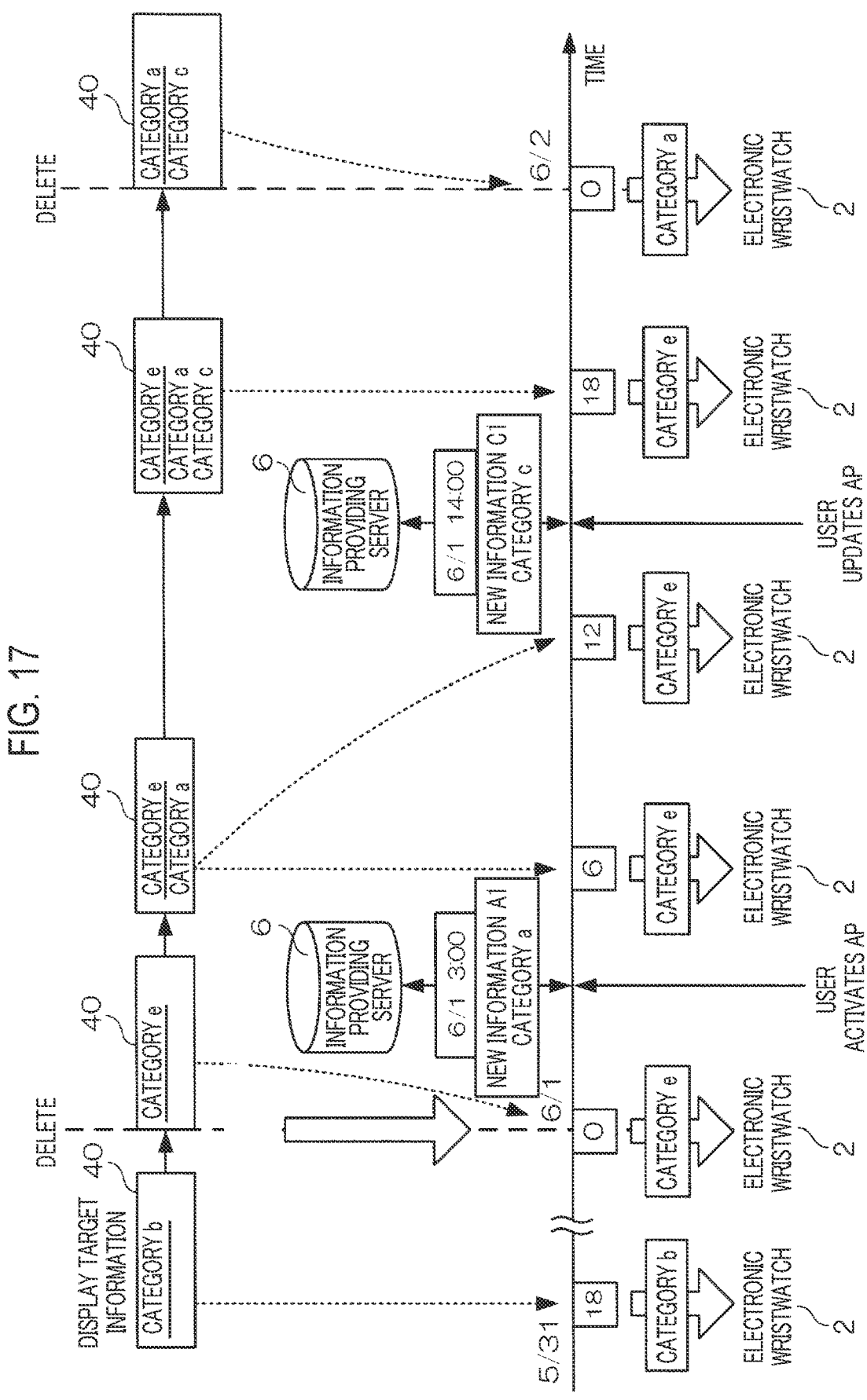
FIG. 17 is a conceptual diagram for explaining operation of an application executed by the information terminal of a third aspect in the second embodiment (personal information; case where the current day is a birthday)

FIG. 17 is a conceptual diagram for explaining operation of an application executed by the information terminal 1 of a third aspect in the second embodiment (personal information; case where the current day is a birthday). As described above, at 0:00 at which the date changes (for example, at 0:00 at which the date changes from May 31 to June 1), the application deletes the category b registered in the display target information 40 as the display target with top priority and empties the display target information 40. Then, at 0:00, the application determines whether the current day (June 1) is the user's birthday. In response to the current day being the user's birthday, the category e to which the birthday information E belongs is registered in the display target information 40 as the display target with top priority because the birthday has the highest priority. In this case, at the fixed time connection with the electronic wristwatch 2 (0:00), information (bitmap data) indicating the category e for birthday is transmitted from the application to the electronic wristwatch 2, without exception. The character string "HBD!" indicating that the current day is the birthday is displayed on the display unit 22 of the electronic wristwatch 2.

Next, when the application is activated by the user at 3:00 on June 1, the application of the information terminal 1 acquires new information A1 and category information (category a) from the information providing server 6. In this case, the category a to which the new information A1 belongs is not the category e registered in the display target information 40 (see NO in step S76 in FIG. 13), the display target information 40 is updated such that the second and subsequent categories including the category a of the new information are in the order based on the priority order, without changing the category e corresponding to the display target with top priority (see step S80 in FIG. 13). In this case, as illustrated in the drawing, the display target information 40 is in the order of the category e, which is the fixed display target with top priority, and then the category a.

Thereafter, since the category with top priority does not change, regardless of whether new information is newly acquired, the information (bitmap data) indicating the category e registered as the display target with top priority is transmitted again from the application to the electronic wristwatch 2 at the fixed time connection with the electronic wristwatch 2 (6:00). The display unit 22 of the electronic wristwatch 2 displays again the character string "HBD!" indicating that the new information of the category e has been acquired. Thereafter, regardless of whether new information is newly acquired, the information (bitmap data) corresponding to the category e registered as the display target with top priority is transmitted from the application to the electronic wristwatch 2 at the fixed time connection with the electronic wristwatch 2 (12:00). The display unit 22 of the electronic wristwatch 2 displays again the character string "HBD!" indicating that the new information of the category e has been acquired. Even if new information is newly acquired between the fixed time (6:00, 12:00), the category of the display target with top priority is not changed although there is a change in the second and subsequent order in the display target information 40. Therefore, the information (bitmap data) indicating the category transmitted to the electronic wristwatch 2 is the same, and the character string "HBD!" is displayed again on the display unit 22 of the electronic wristwatch 2.

Next, when the application is updated by the user at 14:00 on June 1, the application of the information terminal 1 acquires new information C1 and category information (category c) from the information providing server 6. In this case, since the category c to which the new information C1 belongs is none of the categories e and a registered in the display target information 40 (see NO in step S76 in FIG. 13), the display target information 40 is updated such that the second and subsequent categories a including the category c of the new information are in the order based on the priority without changing the category e that is the display target with top priority (see step S80 in FIG. 13). In this case, as illustrated in the drawing, the display target information 40 is in the order of the category e, which is the fixed display target with top priority, and then the category a and the category c.

Thereafter, the information (bitmap data) indicating the category e that is the display target with top priority is transmitted again from the application to the electronic wristwatch 2 at the fixed time connection with the electronic wristwatch 2 (18:00). The character string "HBD!" indicating that the current day is the birthday for the category e is displayed again on the display unit 22 of the electronic wristwatch 2. Accordingly, in a period (predetermined period: 0:00 to 24:00) from the time the category e is registered as the display target with top priority in the display target information 40 until the date changes, the information (bitmap data) indicating the category e is repeatedly transmitted to the electronic wristwatch 2 every time the communication connection between the information terminal 1 and the electronic wristwatch 2 is established.

After 18:00, in response to the user manually establishing the connection, the information (bitmap data) indicating the category e registered as the display target with top priority is sometimes transmitted from the information terminal 1 to the electronic wristwatch 2.

Thereafter, when being connected to the electronic wristwatch 2 at the fixed time (0:00) on June 2 without newly receiving new information, the application of the information terminal 1 deletes the category e that is the display target with top priority registered in the display target information 40 (step S94 in FIG. 14). As a result, as illustrated in the drawing, the next category a becomes the display target with top priority, and then the category c in the display target information 40. Accordingly, the information (bitmap data) indicating the category a is transmitted from the information terminal 1 to the electronic wristwatch 2 at the fixed time (0:00). The display unit 22 of the electronic wristwatch 2 displays the character string "360" indicating that the new information of the category a has been acquired.

In the third aspect of the second embodiment, in response to the current day being the birthday, unlike the first embodiment, even if new information is newly acquired after 0:00, the category e to which the birthday information E belongs is always the display target with top priority regardless of the priority order of the category of the new information. Therefore, on the birthday, the information (bitmap) corresponding to the category e is transmitted every time a connection to the electronic wristwatch 2 is made, and the character string "HBD!" indicating that the current day is the birthday is repeatedly displayed on the display unit 22 of the electronic wristwatch 2. Note that the above-described operation is not limited to the birthday, and the same applies to the purchase birthday.

As described above, in the case of a special day related to an individual user such as a birthday or a purchase anniversary, the application of the information terminal 1 registers the category e to which the birthday information E belongs and the category f to which the purchase anniversary information F belongs as the fixed display target with top priority in the display target information 40 and transmits the corresponding bitmap data to the electronic wristwatch 2. Therefore, it is possible to reliably and efficiently make the user aware that it is the birthday or the purchase anniversary.

In addition, according to the first and second embodiments described above, instead of notifying the new information itself, the information (bitmap data) corresponding to the category to which the new information belongs is transmitted according to the capability of the display unit of the electronic wristwatch 2. Therefore, even in the electronic wristwatch 2 with a relatively small display unit, it is possible to reliably and efficiently make the user aware of what kind of information the new information is.

In addition, according to the first and second embodiments, since the information terminal 1 and the electronic wristwatch 2 are connected to each other only several times in one day in a part-time connection, the power consumption can be reduced as compared with a case of continuous connection, and the battery can last longer. Further, even in the part-time connection in which the connection is made only several times in one day, the category (bitmap data) of the new information having high priority is repeatedly transmitted, and thus, it is possible to reliably and efficiently make the user aware of what kind of information the new information is.

In the second embodiment described above, in response to new information having the latest acquisition time or new information belonging to a category with high priority being acquired during a predetermined period, information (bitmap data) indicating the category is repeatedly transmitted. However, when the user, who has received notification through the electronic wristwatch 2, operates the information terminal 1 and confirms the notified new information on the information terminal 1 side, the application may update the display target with top priority by deleting the category of that new information from the display target information 40.

Furthermore, in the first or second embodiment described above, the category is registered as the display target based on time of new information acquisition or the order of priority set in advance for each category, but the present invention is not limited thereto. For example, in response to a plurality of pieces of new information being acquired, the category of the new information having the largest number of acquired pieces may be registered as the display target with top priority. At this time, if the number of acquired pieces of the new information is the same, the category to be the display target with top priority may be determined according to the order of priority set in advance for each category.

Further, in the first or second embodiment described above, the application of the information terminal 1 accesses the information providing server 6 to acquire new information and category information at the timing when the user activates the application or the timing when the user swipes the home screen of the application downward to update the home screen. However, the present invention is not limited thereto. The application of the information terminal 1 may access the information providing server 6 at predetermined time intervals to acquire the new information and the category information. Alternatively, when new information is registered in the information providing server 6, the information providing server 6 may transmit the new information and the category information to the application of the information terminal 1.

In addition, the first and second embodiments described above have a configuration of the information providing server 6, the information terminal 1, and the electronic wristwatch 2, and the main processing is executed by the information terminal 1. However, the present invention is not limited thereto, and a configuration of the information providing server 6 and the electronic wristwatch 2 may be adopted. In this case, the processing executed by the information terminal 1 may be shared and executed by the information providing server 6 and the electronic wristwatch 2. Alternatively, even in the configuration of the information providing server 6, the information terminal 1, and the electronic wristwatch 2, a part of the processing executed by the information terminal 1 may be executed on the server side or the clock side.

Further, in the first and second embodiments described above, the information (bitmap data) corresponding to the category is merely displayed on the display unit 22. However, the user may be notified of the reception of the notification on the electronic wristwatch 2 side by sound at the timing of the notification to the electronic wristwatch 2. In the case of the notification, different sounds may be made for each category.

Third Embodiment

In the third embodiment, since the configurations of the information terminal 1 and the electronic wristwatch 2 are the same as described above, the description thereof will be omitted, and operations of the information terminal 1 and the electronic wristwatch 2 different from those of the first and second embodiments will be described. In the third embodiment, the information terminal 1 receives, in response to a connection request by manual operation by a user, new information and a category thereof from the information providing server 6 and holds the new information and the category as transmission target information 50, the electronic wristwatch 2 establishes a communication connection with the information terminal 1 at the fixed time connection (four times/day; 0:00, 6:00, 12:00, 18:00; first timing, second timing) preset, acquires the category of the new information that is received by the fixed time and held as the transmission target information 50 in the information terminal 1, registers the category as the display target information 40, and displays information (bitmap data) indicating the category, determines the display target based on the order of priority or the like set in advance to the category to which the new information belongs, or registers the category as the display target with top priority in the display target information 40 to display the information (bitmap data) indicating the category. Accordingly, the electronic wristwatch 2 holds information (bitmap data) indicating each category.

In other words, in the third embodiment, the electronic wristwatch 2 executes the processing performed by the application of the information terminal 1 in the first and second embodiments. There is no change in the algorithm for determining the display order of the categories to be displayed. Specifically, every time a connection is made to the electronic wristwatch 2 during 24 hours a day, among pieces of new information acquired on that day, a category with the highest priority is registered as the display target with top priority. Even if new information is newly acquired in the middle of that day, the category that is the display target with top priority is not changed and a category of the new information newly acquired is added to the display target information 40 according to the priority so as to be the next notification target with top priority. In response to new information belonging to the same category as that of the new information already acquired being acquired, the categories are not redundantly registered.

Figure 18:
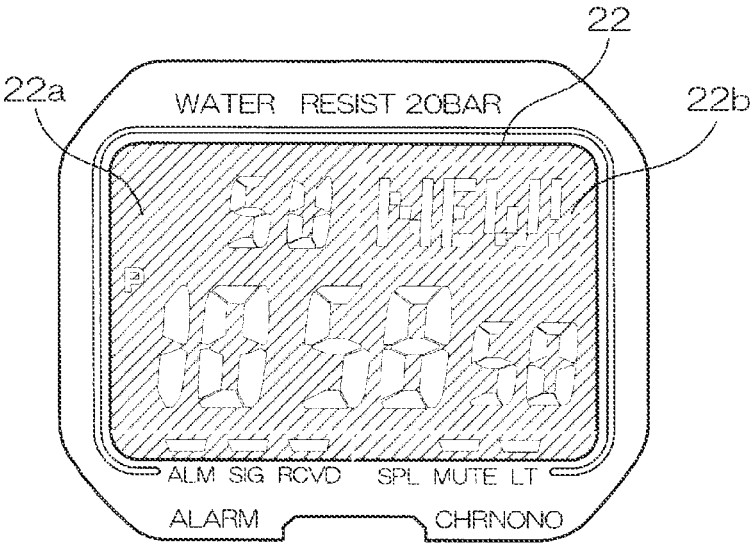
FIG. 18 is a schematic diagram illustrating a display screen example of the electronic wristwatch in a third embodiment.

FIG. 18 is a schematic diagram illustrating a display screen example of the electronic wristwatch 2 in the third embodiment. The display unit 22 of the electronic wristwatch 2 includes a display screen 22a on which a day of the week and time are displayed, and an area 22b is secured in a part of the display screen 22a and in which information (bitmap data) indicating a category of new information is displayed. In FIG. 18, the display screen is hatched with diagonal lines, but is actually displayed with white characters on a black background, black characters on a gray background, or the like.

Figure 19:
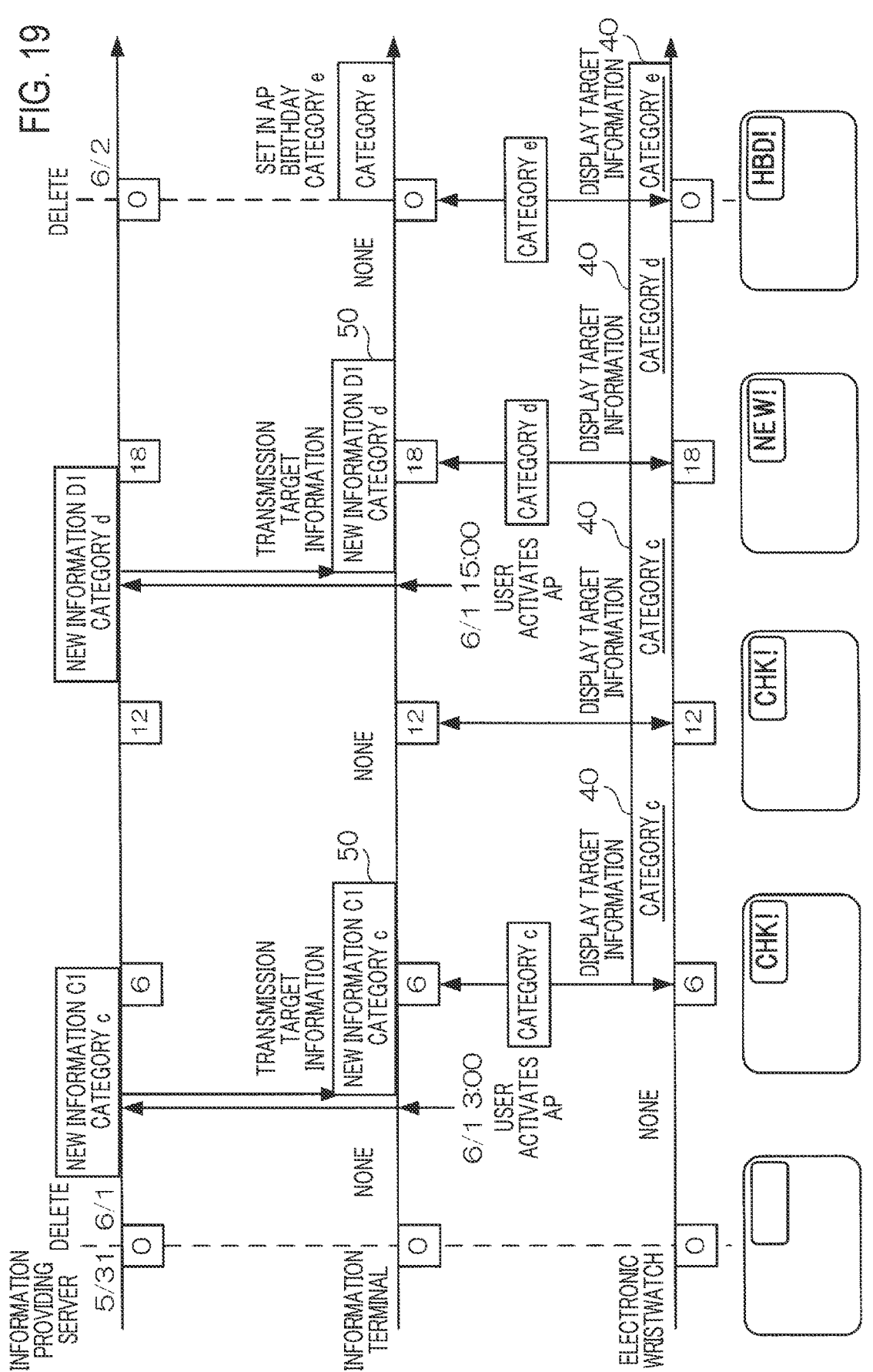
FIG. 19 is a conceptual diagram for explaining operation (operation example of a case where new information of a plurality of different categories is acquired during 24 hours) executed by the electronic wristwatch of a first aspect in the third embodiment.

FIG. 19 is a conceptual diagram for explaining operation (operation example of a case where new information of a plurality of different categories is acquired during 24 hours) executed by the electronic wristwatch 2 of a first aspect in the third embodiment. In the operation example illustrated in FIG. 19, in response to new information being newly acquired during a predetermined period, a category to which the new information newly acquired belongs is registered (overwritten) as a display target with top priority in the display target information 40. First, on May 31, the display target information 40 is not registered in either the information terminal 1 or the electronic wristwatch 2. Then, at the fixed time connection (0:00) on June 1, the electronic wristwatch 2 connects to the information terminal 1 to request the transmission target information 50 therefrom. At this time, since the transmission target information 50 is not registered in the information terminal 1 and the display target information 40 is not registered in the electronic wristwatch 2 itself, the electronic wristwatch 2 does not display information (bitmap data) on a category.

Next, at 3:00 on June 1, the application of the information terminal 1 is activated by the user, which triggers access to the information providing server 6, and the presence or absence of new information is checked. At this time, since there is new information C1 (category c) in the information providing server 6, the information terminal 1 acquires the new information C1 and category information (category c) from the information providing server 6 and registers the new information C1 and the category information (category c) as the transmission target information 50.

Then, at the fixed time connection (6:00), the electronic wristwatch 2 connects to the information terminal 1 to request the transmission target information therefrom. At this time, since the new information C1 and the category information (category c) are registered as the transmission target information 50 in the information terminal 1, the electronic wristwatch 2 acquires the category information (category c) of the new information C1 from the information terminal 1. In the information terminal 1, the transmission target information 50 is deleted. The electronic wristwatch 2 registers the acquired category information (category c) as the display target information 40, and displays the character string "CHK!" indicating that the new information C1 of the category c has been acquired in the area 22b of the display unit 22. In addition, the display target information 40 in the electronic wristwatch 2 is held until the next fixed time connection (12:00).

Then, at the fixed time connection (12:00), the electronic wristwatch 2 connects to the information terminal 1 to request the transmission target information 50 therefrom. At this time, since the transmission target information 50 is not registered in the information terminal 1, the electronic wristwatch 2 displays the character string "CHK!" indicating the category information (category c) of the new information C1 registered therein as the display target information 40 in the area 22b of the display unit 22. In addition, the display target information 40 in the electronic wristwatch 2 is held until the next fixed time connection (18:00).

Next, at 15:00 on June 1, the application of the information terminal 1 is activated by the user, which triggers access to the information providing server 6, and the presence or absence of new information is checked. At this time, since new information D1 (category d) is received in the information providing server 6, the information terminal 1 acquires category information (category d) of the new information D1 from the information providing server 6 and registers the category information (category d) as the display target information 40.

Then, at the fixed time connection (18:00), the electronic wristwatch 2 connects to the information terminal 1 to request the transmission target information 50 therefrom. At this time, since the new information D1 and the category information (category d) are registered as the transmission target information 50 in the information terminal 1, the electronic wristwatch 2 acquires the category information (category d) of the new information D1 from the information terminal 1. In the information terminal 1, the transmission target information 50 is deleted. The electronic wristwatch 2 overwrites and registers the acquired category information (category d) as the new display target information 40 in the category information (category c), and displays the character string "NEW!" indicating that the new information D1 of the category d has been acquired in the area 22b of the display unit 22. In addition, the display target information 40 in the electronic wristwatch 2 is held until the next fixed time connection (0:00).

Then, at the fixed time connection (0:00) on June 2, the electronic wristwatch 2 deletes the category d registered in the display target information 40 and empties the display target information 40, and then connects to the information terminal 1 to request the transmission target information 50 therefrom. The information terminal 1 determines whether the current day (June 2) is the user's birthday, and in response to the current day being the user's birthday, the category e to which the birthday information E belongs is registered as the transmission target information 50 because the birthday has the highest priority. Therefore, the electronic wristwatch 2 acquires the category e for the birthday from the information terminal 1, overwrites and registers the category information (category d) as the new display target information 40, and displays the character string "HBD!" indicating that the current day is the birthday in the area 22b of the display unit 22.

In the first aspect of the third embodiment described above, in response to new information being newly acquired during a predetermined period, a category to which the new information newly acquired belongs is registered (overwritten) in the display target information 40 as the display target with top priority. Therefore, every time new information is newly acquired, the electronic wristwatch 2 displays information (bitmap data) indicating a category to which that new information belongs. As a result, it is possible to reliably and efficiently make the user aware of what kind of new information has been acquired each time new information is newly acquired.

Figure 20:
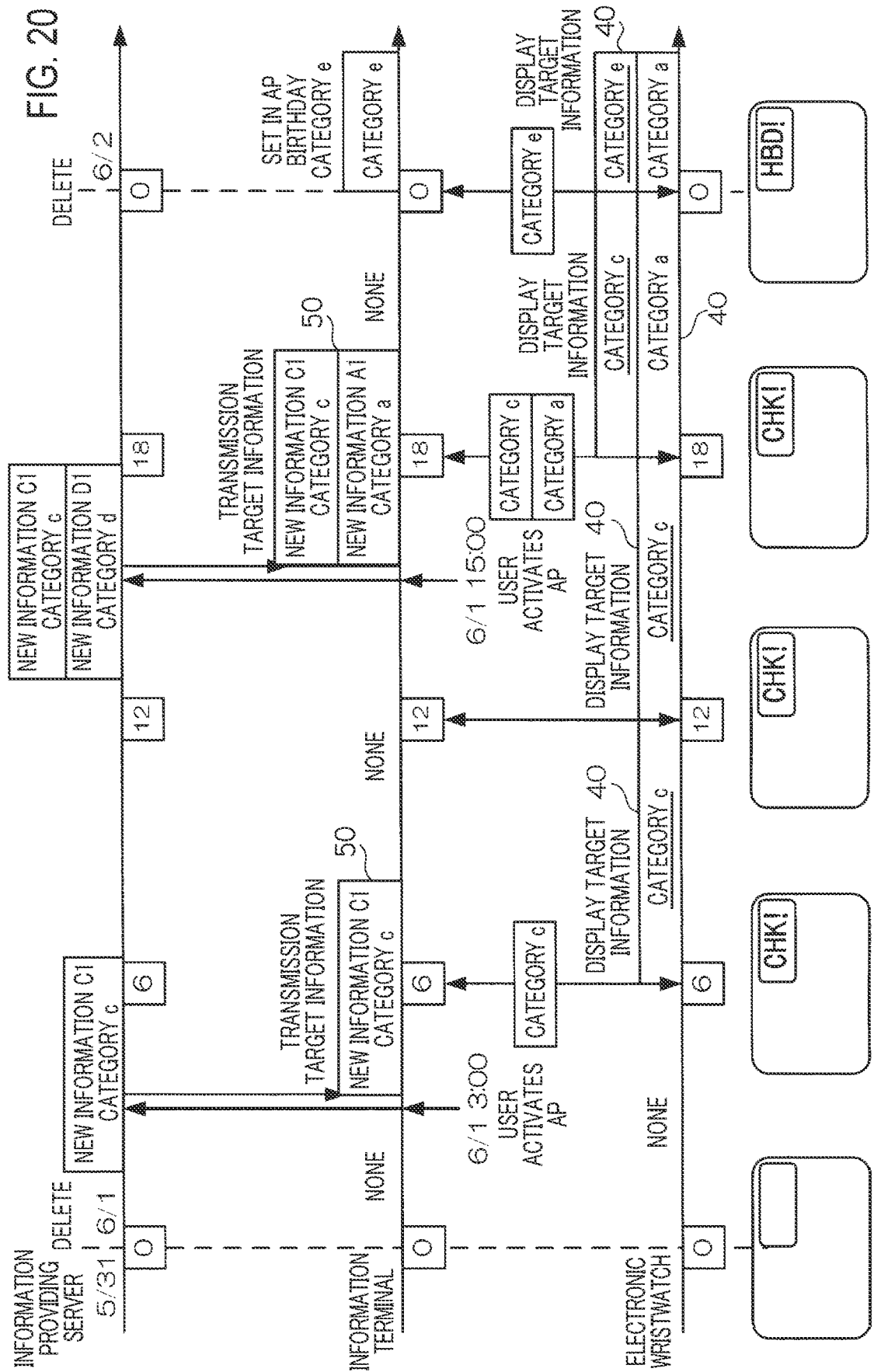
FIG. 20 is a conceptual diagram for explaining operation (first operation example of a case where, when a category is already registered in display target information, new information of a category with high priority and a category with the same priority is acquired in one day) executed by the electronic wristwatch of a second aspect in the third embodiment.

FIG. 20 is a conceptual diagram for explaining operation (first operation example of a case where, when a category is already registered in the display target information 40, new information of a category with high priority and a category with the same priority is acquired in one day) executed by the electronic wristwatch 2 of a second aspect in the third embodiment. In the operation example illustrated in FIG. 20, even if new information is newly acquired in the middle of the day, the category that is the display target with top priority is not changed, and the category of the new information that acquired later is added to the display target information 40 according to the priority so as to be the next notification target with top priority. In the case of acquiring, as new information, new information that belongs to the same category as that of the new information already acquired, the category of the new information is combined with the category registered in the display target information 40 into one category, and the same category is not redundantly registered.

As illustrated in FIG. 20, first, on May 31, the display target information 40 is not registered in either the information terminal 1 or the electronic wristwatch 2. Then, at the fixed time connection (0:00) on June 1, the electronic wristwatch 2 connects to the information terminal 1 to request the transmission target information 50 therefrom. At this time, since the transmission target information 50 is not registered in the information terminal 1 and the display target information 40 is not registered in the electronic wristwatch 2 itself, the electronic wristwatch 2 does not display information (bitmap data) on a category.

Next, at 3:00 on June 1, the application of the information terminal 1 is activated by the user, which triggers access to the information providing server 6, and the presence or absence of new information is checked. At this time, since there is new information C1 (category c) in the information providing server 6, the information terminal 1 acquires the new information C1 and category information (category c) from the information providing server 6 and registers the new information C1 and the category information (category c) as the transmission target information 50.

Then, at the fixed time connection (6:00), the electronic wristwatch 2 connects to the information terminal 1 to request the transmission target information 50 therefrom. At this time, since the new information C1 and the category information (category c) are registered as the transmission target information 50 in the information terminal 1, the electronic wristwatch 2 acquires the category information (category c) of the new information C1 from the information terminal 1. In the information terminal 1, the transmission target information is deleted. The electronic wristwatch 2 registers the acquired category information (category c) as the display target information 40, and displays the character string "CHK!" indicating that the new information C1 of the category c has been acquired in the area 22b of the display unit 22. In addition, the display target information 40 in the electronic wristwatch 2 is held until the next fixed time connection (12:00).

Then, when the fixed time connection (12:00) is reached with the information terminal 1 not newly receiving new information, the electronic wristwatch 2 connects to the information terminal 1 to request the transmission target information 50 therefrom. At this time, since the transmission target information 50 is not registered in the information terminal 1, the electronic wristwatch 2 displays the character string "CHK!" indicating the category information (category c) already registered therein as the display target information 40 in the area 22b of the display unit 22. In addition, the display target information 40 in the electronic wristwatch 2 is held until the next fixed time connection (18:00).

Next, at 15:00 on June 1, the application of the information terminal 1 is activated by the user, which triggers access to the information providing server 6, and the presence or absence of new information is checked. At this time, since there is the new information C1 (category c) and new information A1 (category a) in the information providing server 6, the information terminal 1 acquires the new information C1 (category c) and the new information A1 (category a) from the information providing server 6 and registers the new information C1 (category c) and the new information A1 (category a) as the transmission target information 50.

Then, at the fixed time connection (18:00), the electronic wristwatch 2 connects to the information terminal 1 to request the transmission target information 50 therefrom. At this time, since the new information C1 (category c) and the new information A1 (category a) are registered as the transmission target information 50 in the information terminal 1, the electronic wristwatch 2 acquires the category information (category c) of the new information C1 and the category information (category a) of the new information A1 from the information terminal 1. In the information terminal 1, the transmission target information 50 is deleted.

In this case, since the category c of the new information C2 is a category already registered in the display target information 40, the electronic wristwatch 2 updates the display target information 40 so as to combine the overlapping categories c into one. Here, since the category of the display target acquired first is set as the display target information with top priority, the category c already registered as the display target information 40 is set as the display target with top priority, and then the category a is set as the display target. Accordingly, the electronic wristwatch 2 displays the character string "CHK!" indicating the category information (category c) registered therein as the display target information with top priority in the area 22*b* of the display unit 22. In addition, the display target information 40 (category c, category a) in the electronic wristwatch 2 is held until the next fixed time connection (0:00).

Thereafter, when the fixed time (0:00) on June 2 is reached without newly receiving new information, the electronic wristwatch 2 deletes the category c registered as the display target with top priority in the display target information 40 and connects to the information terminal 1 to request the transmission target information 50 therefrom. The information terminal 1 determines whether the current day (June 2) is the user's birthday, and in response to the current day being the user's birthday, the category e to which the birthday information E belongs is registered as the transmission target information 50. Therefore, the electronic wristwatch 2 acquires the category e for the birthday from the information terminal 1, and since the priority order of the birthday is the highest (in any case, the priority order thereof is top), the electronic wristwatch 2 registers the category e and then the category a in this order as the display target information 40 as illustrated in the drawing. Then, the electronic wristwatch 2 displays the character string "HBD!" indicating that the current day is the birthday which is given top priority, in the area 22*b* of the display unit 22.

In the second aspect of the third embodiment described above, even if new information is newly acquired in the middle of the day, the category that is the display target with top priority is not changed, and the category of the new information acquired later is added to the display target information 40 according to the priority so as to be the next notification target with top priority. Therefore, the information indicating the category of the first acquired new information is repeatedly displayed on the display unit 22 of the electronic wristwatch 2 each time a connection to the information terminal 1 is made, which makes it possible to reliably and efficiently make the user aware of the category of the first acquired new information.

Figure 21:
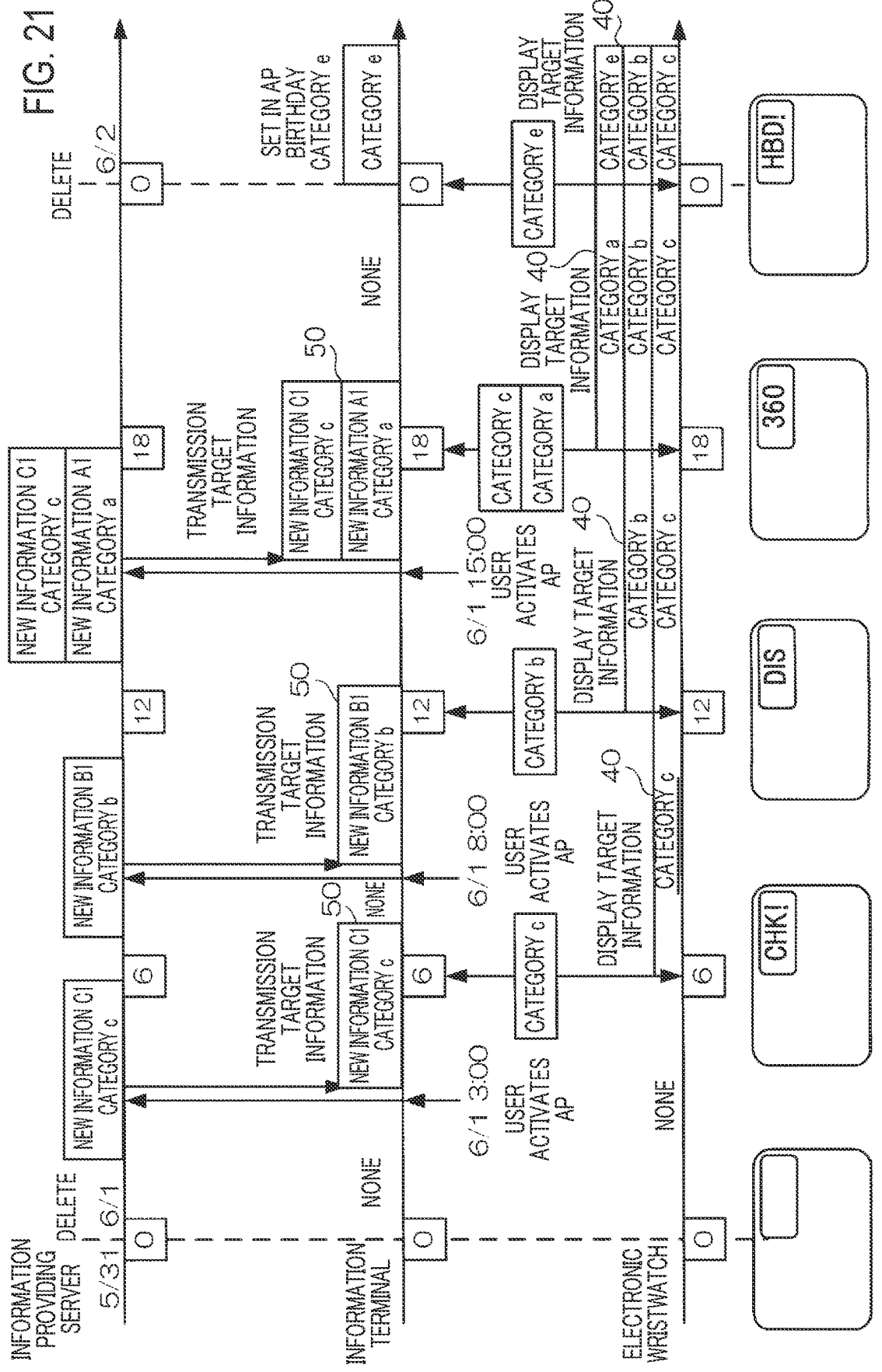
FIG. 21 is a conceptual diagram for explaining operation (second operation example of a case where, when a category is already registered in display target information, new information of a category with high priority and a category with lower priority is acquired in one day) executed by the electronic wristwatch of a third aspect in the third embodiment.

FIG. 21 is a conceptual diagram for explaining operation (second operation example of a case where, when a category is already registered in the display target information 40, new information of a category with high priority and a category with lower priority is acquired in one day) executed by the electronic wristwatch 2 of a third aspect in the third embodiment. In the operation example illustrated in FIG. 21, in response to new information being newly acquired in the middle of the day, the order of the category to be the display target with top priority is determined according to the order of priority set in advance for each category. In the case of acquiring, as new information, new information that belongs to the same category as that of the new information already acquired, the category of the new information is combined with the category registered in the display target information 40 into one category, and the same category is not redundantly registered.

As illustrated in FIG. 21, first, on May 31, the display target information 40 is not registered in either the information terminal 1 or the electronic wristwatch 2. Then, at the fixed time connection (0:00) on June 1, the electronic wristwatch 2 connects to the information terminal 1 to request the transmission target information 50 therefrom. At this time, since the transmission target information 50 is not registered in the information terminal 1 and the display target information 40 is not registered in the electronic wristwatch 2 itself, the electronic wristwatch 2 does not display information (bitmap data) on a category.

Next, at 3:00 on June 1, the application of the information terminal 1 is activated by the user, which triggers access to the information providing server 6, and the presence or absence of new information is checked. At this time, since there is new information C1 (category c) in the information providing server 6, the information terminal 1 acquires the new information C1 and category information (category c) from the information providing server 6 and registers the new information C1 and the category information (category c) as the transmission target information 50.

Then, at the fixed time connection (6:00), the electronic wristwatch 2 connects to the information terminal 1 to request the transmission target information 50 therefrom. At this time, since the new information C1 and the category information (category c) are registered as the transmission target information 50 in the information terminal 1, the electronic wristwatch 2 acquires the category information (category c) of the new information C1 from the information terminal 1. In the information terminal 1, the transmission target information 50 is deleted. The electronic wristwatch 2 registers the acquired category information (category c) as the display target information 40, and displays the character string "CHK!" indicating that the new information C1 of the category c has been acquired in the area 22*b* of the display unit 22. In addition, the display target information 40 in the electronic wristwatch 2 is held until the next fixed time connection (12:00).

Next, at 8:00 on June 1, the application of the information terminal 1 is activated by the user, which triggers access to the information providing server 6, and the presence or absence of new information is checked. At this time, since there is new information B1 (category b) in the information providing server 6, the information terminal 1 acquires the new information B1 and the category information (category b) from the information providing server 6 and registers the new information B1 and the category information (category b) as the transmission target information 50.

Then, at the fixed time connection (12:00), the electronic wristwatch 2 connects to the information terminal 1 to request the transmission target information 50 therefrom. At this time, since the new information B1 and the category information (category b) are registered as the transmission target information 50 in the information terminal 1, the electronic wristwatch 2 acquires the category information (category b) of the new information B1 from the information terminal 1. In the information terminal 1, the transmission target information 50 is deleted.

In this case, since the category b to which the new information B1 belongs is not the category c already registered in the display target information 40, the electronic wristwatch 2 additionally registers the category b in the display target information 40. At this time, the electronic wristwatch 2 determines the order according to the priority of all the categories in the display target information 40. In this case, the category b of the new information B1 newly acquired has higher priority than that of the category c already registered in the display target information 40. Thus, as the display target information 40, the category b that is the display target with top priority, and then the category c is registered in this order. In response to a category of new information being a category already registered in the display target information 40, the same categories are combined into one. As described above, the display target information 40 is updated such that all the categories registered in the display target information 40 including the category of the display target with top priority are in descending order of priority.

As a result, the electronic wristwatch 2 displays the character string "DIS" indicating that the new information B1 of the category b registered as the display target with top priority has been acquired. In addition, the display target information 40 in the electronic wristwatch 2 is held until the next fixed time connection (18:00).

Next, at 15:00 on June 1, the application of the information terminal 1 is activated by the user, which triggers access to the information providing server 6, and the presence or absence of new information is checked. At this time, since there is the new information C1 (category c) and new information A1 (category a) in the information providing server 6, the information terminal 1 acquires the new information C1 (category c) and the new information A1 (category a) from the information providing server 6 and registers the new information C1 (category c) and the new information A1 (category a) as the transmission target information 50.

Then, at the fixed time connection (18:00), the electronic wristwatch 2 connects to the information terminal 1 to request the transmission target information 50 therefrom. At this time, since the new information C1 (category c) and the new information A1 (category a) are registered as the transmission target information 50 in the information terminal 1, the electronic wristwatch 2 acquires the category information (category c) of the new information C1 and the category information (category a) of the new information A1 from the information terminal 1. In the information terminal 1, the transmission target information 50 is deleted.

In this case, since the category c of the new information C2 is a category already registered in the display target information 40, the electronic wristwatch 2 updates the display target information 40 so as to combine the overlapping categories c into one. In addition, in this operation example, since the order of the display targets is determined according to the priority, the newly acquired category a, then the category b, and then the category c are registered in descending order of priority. Accordingly, the electronic wristwatch 2 displays the character string "360" indicating the category information (category a) registered as the display target with top priority in the area 22b of the display unit 22. In addition, the display target information 40 (category a, category b, category c) in the electronic wristwatch 2 is held until the next fixed time connection (0:00).

Thereafter, when the fixed time (0:00) on June 2 is reached without newly receiving new information, the electronic wristwatch 2 deletes the category a registered as the display target with top priority in the display target information 40 and connects to the information terminal 1 to request the transmission target information 50 therefrom. The information terminal 1 determines whether the current day (June 2) is the user's birthday, and in response to the current day being the user's birthday, the category e to which the birthday information E belongs is registered as the transmission target information 50. Therefore, the electronic wristwatch 2 acquires the category e for the birthday, and since the priority order of the birthday is the highest (in any case, the priority order thereof is top), the electronic wristwatch 2 registers the category e and then the category b, c in this order as the display target information 40 as illustrated in the drawing. The electronic wristwatch 2 then displays the character string "HBD!" indicating the category information (birthday; category e) registered as the display target with top priority in the area 22b of the display unit 22.

In the third aspect of the third embodiment described above, in response to new information being newly acquired in the middle of the day, the order of the category to be the display target with top priority is determined according to the order of priority set in advance for each category, and the information (bitmap data) indicating the category of the new information is displayed according to the priority determined. Therefore, it is possible to reliably and efficiently make the user aware of the category of the new information with high priority.

Figure 22:
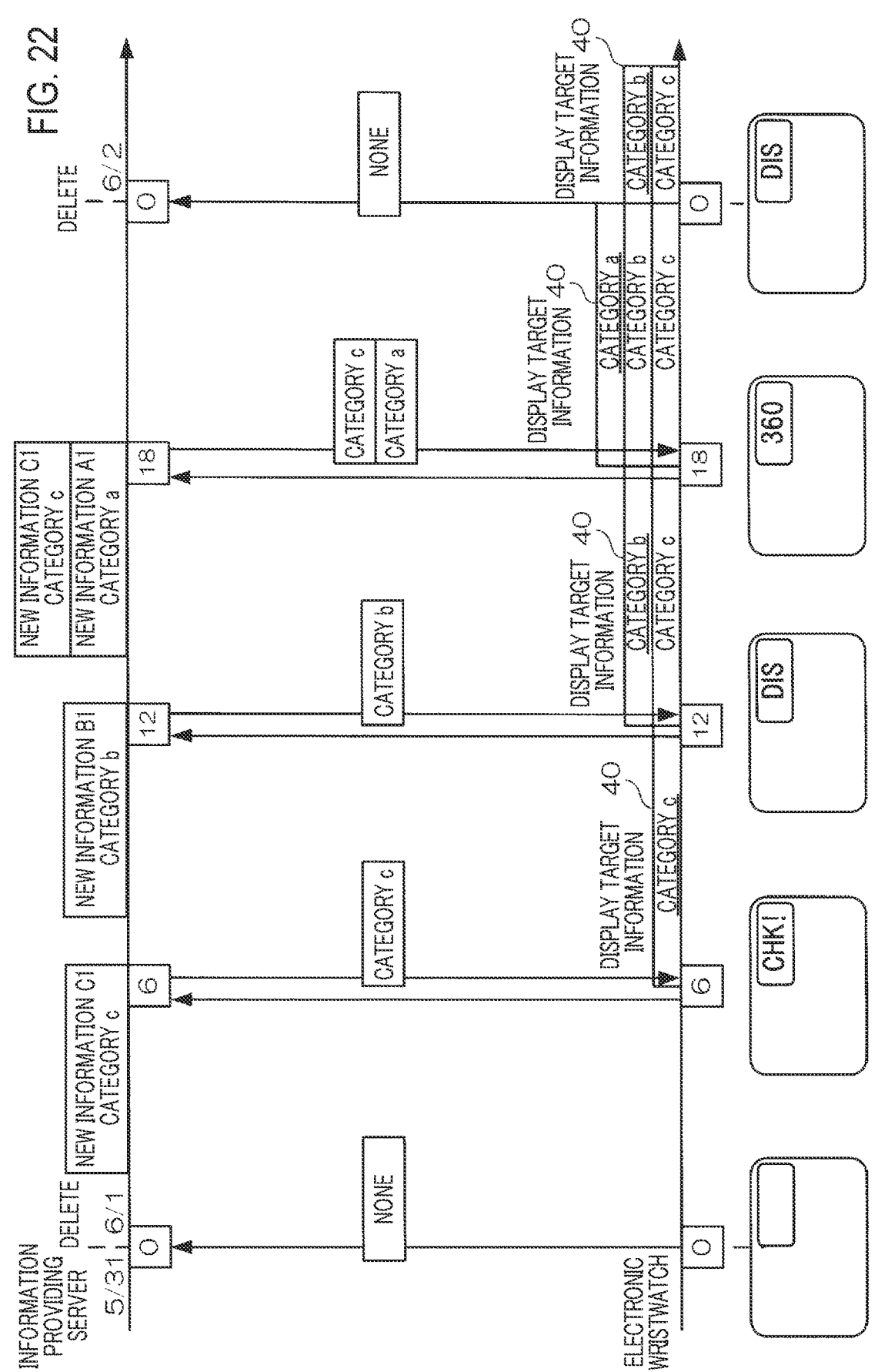
FIG. 22 is a conceptual diagram for explaining operation (operation not via the information terminal) executed by the electronic wristwatch of a fourth aspect in the third embodiment.

FIG. 22 is a conceptual diagram for explaining operation (operation not via the information terminal 1) executed by the electronic wristwatch 2 of a fourth aspect in the third embodiment. In the fourth aspect, the electronic wristwatch 2 acquires a category of new information from the information providing server 6 without passing through the information terminal 1 in the third aspect described above.

First, on May 31, there is no new information in the information providing server 6, and the display target information 40 is not registered in the electronic wristwatch 2. Then, at the fixed time connection (0:00) on June 1, the electronic wristwatch 2 connects to the information providing server 6 to check whether there is new information. At this time, since there is no new information in the information providing server 6 and the display target information 40 is not registered in the electronic wristwatch 2 itself, the electronic wristwatch 2 does not display information (bitmap data) on a category.

Then, at the fixed time connection (6:00), the electronic wristwatch 2 connects to the information providing server 6 to check whether there is new information. At this time, since there is new information C1 and category information (category c) as the new information in the information providing server 6, the electronic wristwatch 2 acquires the category information (category c) of the new information C1 from the information providing server 6. The information providing server 6 deletes the new information. The electronic wristwatch 2 registers the acquired category information (category c) as the display target information 40, and displays the character string "CHK!" indicating that the new information C1 of the category c has been acquired in the area 22b of the display unit 22. The display target information 40 in the electronic wristwatch 2 is held until the next fixed time connection (12:00).

Then, at the fixed time connection (12:00), the electronic wristwatch 2 connects to the information providing server 6 to check whether there is new information. At this time, since there is new information B1 and category information (category b) as the new information in the information providing server 6, the electronic wristwatch 2 acquires the category information (category b) of the new information B1 from the information providing server 6. The information providing server 6 deletes the new information.

In this case, since the category b to which the new information B1 belongs is not the category c already registered in the display target information 40, the electronic wristwatch 2 additionally registers the category b in the display target information 40. At this time, the electronic wristwatch 2 registers the category b that is the display target with top priority, and then the category c in this order according to the priority as described above. In response to a category of new information being a category already registered in the display target information 40, the electronic wristwatch 2 combines the same categories into one. The electronic wristwatch 2 displays the character string "DIS" indicating that the new information B1 of the category b registered as the display target with top priority has been acquired. In addition, the display target information 40 in the electronic wristwatch 2 is held until the next fixed time connection (18:00).

Then, at the fixed time connection (18:00), the electronic wristwatch 2 connects to the information providing server 6 to check whether there is new information. At this time, since the new information C1 (category c) and the new information A1 (category a) are registered as the new information in the information providing server 6, the electronic wristwatch 2 acquires the category information (category c) of the new information C1 and the category information (category a) of the new information A1 from the information providing server 6. The information providing server 6 deletes the new information.

In this case, since the category c of the new information C2 is a category already registered in the display target information 40, the electronic wristwatch 2 updates the display target information 40 so as to combine the overlapping categories c into one. Further, as described above, the newly acquired category a, then the category b, and then the category c are registered in descending order of priority. Accordingly, the electronic wristwatch 2 displays the character string "360" indicating the category information (category a) registered as the display target with top priority in the area 22b of the display unit 22. The display target information 40 (category a, category b, category c) in the electronic wristwatch 2 is held until the next fixed time connection (0:00).

Thereafter, when the fixed time (0:00) on June 2 is reached without newly receiving new information by the information providing server 6, the electronic wristwatch 2 deletes the category a registered as the display target with top priority in the display target information 40 and connects to the information providing server 6 to check whether there is new information. The electronic wristwatch 2 displays the character string "DIS" indicating the category information (category b) registered as the display target with top priority in the area 22b of the display unit 22.

Note that, in the fourth aspect of the third embodiment described above, the electronic wristwatch 2 directly acquires the information from the information providing server 6; however, the information providing server 6 may transmit (PUSH) the information to the electronic wristwatch 2 at a predetermined timing (or at any time).

According to the fourth aspect of the third embodiment described above, since the electronic wristwatch 2 directly acquires the category of the new information from the information providing server 6, it is possible to make the user aware that the new information has been acquired with a simpler configuration.

In addition, in the third embodiment described above, the electronic wristwatch 2 requests the transmission target information from the information terminal 1 at the fixed time connection (four times a day; 0:00, 6:00, 12:00, 18:00) preset, or directly acquires the category information of the new information from the information providing server 6. However, the present invention is not limited thereto. Another configuration is possible in which when the user performs operation, on the electronic wristwatch 2, for displaying the display target information in a state where the electronic wristwatch 2 side holds the display target information in the memory 21, the display target information 40 is read from the memory 21 of the electronic wristwatch 2 even if it is not the fixed time, and a character string indicating the registered category information is displayed in the area 22b of the display unit 22. As a result, the character string indicating the category information registered as the display target information 40 can be displayed even in a state where the electronic wristwatch 2 is not connected to the information terminal 1 or the information providing server 6 (even if it is not the fixed time), it is possible to confirm that new information has arrived even if the user misses the display target information 40 at the fixed time.

What is claimed is:

1. An information terminal comprising:
at least one processor configured to:
    in response to information of a first category to which first notification information to be notified to a user belongs being acquired, store the first category as display target information;
    in response to information of a category to which second notification information, different from the first notification information, being acquired at a timing after the information of the first category is acquired, and if the category to which the second notification information belongs is the first category, store the first category as the display target information;
    in response to information of a category to which second notification information, different from the first notification information, being acquired at a timing after the information of the first category is acquired, and if the category to which the second notification information belongs is a second category different from the first category, store the second category as the display target information; and
    maintain the information of the first category as the display target information until the information of the category to which the second notification information belongs is acquired after the information of the first category is acquired.

2. The information terminal according to claim 1, wherein the at least one processor is configured to:
    in response to a communication connection to a first external device being established at a first timing, transmit, to the first external device, information indicating a category stored as the display target information; and
    maintain the information of the first category as the display target information until the information of the category to which the second notification information belongs is acquired after the information of the first category is acquired, even after transmitting, to the first external device, the information indicating a category stored as the display target information.

3. The information terminal according to claim 2, wherein the at least one processor is configured to:
    store a plurality of categories in the display target information; and
    in response to the plurality of categories being stored in the display target information at a time of establishing the communication connection to the first external device at the first timing, transmit, to the first external device, information indicating, among the plurality of categories, a category stored as display target information with top priority to which highest priority for display is given.

4. The information terminal according to claim 3, wherein each of the plurality of categories is given an order of priority, and
wherein the at least one processor is configured to, when storing the second category, store the first category, already stored, as the display target information with top priority regardless of the order of priority.

5. The information terminal according to claim 4, wherein the plurality of categories includes:

a personal category corresponding to notification information based on information registered in advance by the user; and a new information category corresponding to notification information acquired from a second external device different from the first external device, and wherein the order of priority of the personal category is set to be higher than the order of priority of the new information category.

6. The information terminal according to claim 3, wherein each of the plurality of categories is given an order of priority, and wherein the at least one processor is configured to, when storing the second category, store the second category as the display target information with top priority if the second category has the order of priority higher than that of the first category.

7. The information terminal according to claim 2, wherein the at least one processor is configured to, in response to a communication connection to the first external device being established at a second timing later than the first timing, transmit, to the first external device, information indicating a same category as a category of the information transmitted at the first timing if the second timing falls within a predetermined period.

8. The information terminal according to claim 7, wherein the predetermined period is a period from a time the category is stored as the display target information until a date changes.

9. The information terminal according to claim 1, wherein the at least one processor is configured to, in response to the second category being newly stored, delete the first category that is already stored as the display target information.

10. A method by an information terminal including at least one processor, the method comprising:

in response to information of a first category to which first notification information to be notified to a user belongs being acquired, storing, by the at least one processor, the first category as display target information;

in response to information of a category to which second notification information, different from the first notification information, being acquired at a timing after the information of the first category is acquired, and if the category to which the second notification information belongs is the first category, storing, by the at least one processor, the first category as the display target information;

in response to the information of the category to which the second notification information being acquired at a timing after the information of the first category is acquired, and if the category to which the second notification information belongs is a second category different from the first category, storing, by the at least one processor, the second category as the display target information; and maintaining, by the at least one processor, the information of the first category as the display target information until the information of the category to which the second notification information belongs is acquired after the information of the first category is acquired.

11. The method according to claim 10, comprising:

in response to a communication connection to a first external device being established at a first timing, transmitting, by the at least one processor, to the first external device, information indicating a category stored as the display target information.

12. The method according to claim 11, comprising:

storing, by the at least one processor, a plurality of categories in the display target information; and in response to a plurality of categories being stored in the display target information at a time of establishing the communication connection to the first external device at the first timing, transmitting, by the at least one processor, to the first external device, information indicating, among the plurality of categories, a category stored as display target information with top priority to which highest priority for display is given.

13. The method according to claim 12, wherein each of the plurality of categories is given an order of priority, and wherein the method further comprises storing, by the at least one processor, the first category, already stored, as the display target information with top priority regardless of the order of priority when storing the second category.

14. The method according to claim 12, wherein each of the plurality of categories is given an order of priority, and wherein the method further comprises storing, by the at least one processor, the second category as the display target information with top priority if the second category has the order of priority higher than that of the first category when storing the second category.

15. The method according to claim 10, comprising:

in response to the second category being newly stored, deleting, by the at least one processor, the first category that is already stored as the display target information.

16. A non-transitory computer-readable storage medium storing thereon a computer program, wherein the computer program, when executed, causes at least one processor of a computer to at least:

in response to information of a first category to which first notification information to be notified to a user belongs being acquired, store the first category as display target information;

in response to information of a category to which second notification information, different from the first notification information, being acquired at a timing after the information of the first category is acquired, and if the category to which the second notification information belongs is the first category, store the first category as the display target information;

in response to the information of the category to which the second notification information being acquired at a timing after the information of the first category is acquired, and if the category to which the second notification information belongs is a second category different from the first category, store the second category as the display target information; and maintain the information of the first category as the display target information until the information of the category to which the second notification information belongs is acquired after the information of the first category is acquired.

17. The non-transitory computer-readable storage medium according to claim 16, wherein the computer program, when executed, causes the at least one processor to:

in response to a communication connection to a first external device being established at a first timing, transmit, to the first external device, information indicating a category stored as the display target information.

18. The non-transitory computer-readable storage medium according to claim 17, wherein the computer program, when executed, causes the at least one processor to:

store a plurality of categories in the display target information; and in response to a plurality of categories being stored in the display target information at a time of establishing the communication connection to the first external device at the first timing, transmit, to the first external device, information indicating, among the plurality of categories, a category stored as display target information with top priority to which highest priority for display is given.

19. The non-transitory computer-readable storage medium according to claim 18, wherein each of the plurality of categories is given an order of priority, and wherein the computer program, when executed, causes the at least one processor to:

when storing the second category, store the first category, already stored, as the display target information with top priority regardless of the order of priority.

20. The non-transitory computer-readable storage medium according to claim 16, wherein the computer program, when executed, causes the at least one processor to:

in response to the second category being newly stored, delete the first category that is already stored as the display target information.

* * * * *